US011982749B2

(12) United States Patent
Rainko et al.

(10) Patent No.: US 11,982,749 B2
(45) Date of Patent: May 14, 2024

(54) DETECTION OF PULSE TRAINS BY TIME-OF-FLIGHT LIDAR SYSTEMS

(71) Applicant: Aptiv Technologies AG, Schaffhausen (CH)

(72) Inventors: Denis Rainko, Essen (DE); Geng Fu, Belmont, MA (US); Ali Haddadpour, Boston, MA (US); Roman Dietz, Berlin (DE)

(73) Assignee: Aptiv Technologies AG, Schaffhausen (CH)

( * ) Notice: Subject to any disclaimer, the term of this patent is extended or adjusted under 35 U.S.C. 154(b) by 904 days.

(21) Appl. No.: 16/927,499

(22) Filed: Jul. 13, 2020

(65) Prior Publication Data

US 2022/0011434 A1    Jan. 13, 2022

(51) Int. Cl.
*G01S 17/894*    (2020.01)
*G01S 7/481*    (2006.01)
(Continued)

(52) U.S. Cl.
CPC ............ *G01S 17/894* (2020.01); *G01S 7/481* (2013.01); *G01S 7/483* (2013.01); *G01S 17/931* (2020.01)

(58) Field of Classification Search
CPC ...... G01S 17/894; G01S 17/931; G01S 7/481; G01S 7/483; G01S 7/484; G01S 7/486
(Continued)

(56) References Cited

U.S. PATENT DOCUMENTS 9,958,545 B2    5/2018 Eichenholz et al.
10,353,075 B2    7/2019 Buskila et al.
(Continued)

FOREIGN PATENT DOCUMENTS

| DE | 212017000248 | 6/2019 |
|---|---|---|
| DE | 102018202848 | 8/2019 |
| WO | 2019079532 | 4/2019 |

OTHER PUBLICATIONS

Horaud, et al., "An Overview of Depth Cameras and Range Scanners Based on Time-of-Flight Technologies", Machine Vision and Applications, vol. 27, No. 7, pp. 1005-1020; Retrieved from https://doi.org/10.1007/s00138-016-0784-4, 2016, 18 pages.

(Continued)

*Primary Examiner* — Daniel L Murphy
(74) *Attorney, Agent, or Firm* — Harness, Dickey & Pierce, P.L.C.

(57) ABSTRACT

This document describes a time-of-flight lidar system configured to process pulse trains instead of individual pulses, for improved range resolution and pixel throughput. Each pulse in the pulse train is output at a respective duration and intensity, which may vary to provoke a return with a high-intensity and low signal ambiguity, prevent thermal build-up, or promote safe ocular operation. An expected intensity of the return as a function of time can be determined. By sampling reflections at the expected times and intensities, the lidar system quickly identifies a corresponding lidar return, even despite lidar noise. A return time of the return can indicate a distance or speed associated with an object pixel in a field-of-view. Processing pulse trains instead of individual pulses allows pixels to be scanned faster than using long durations or frame times, which also promotes ocular safety. Increased throughput is realized using low-energy lasers and inexpensive hardware, which minimize thermal footprint.

29 Claims, 13 Drawing Sheets

(51) Int. Cl.
*G01S 7/483* (2006.01)
*G01S 17/931* (2020.01)

(58) Field of Classification Search
USPC ........................................................ 356/4.01
See application file for complete search history.

(56) References Cited

U.S. PATENT DOCUMENTS

| | | | |
|---|---|---|---|
| 10,481,268 B2 | 11/2019 | Vlaiko et al. | |
| 2013/0010820 A1* | 1/2013 | Curtis | G02B 27/48 372/23 |
| 2017/0131387 A1 | 5/2017 | Campbell et al. | |
| 2017/0269209 A1 | 9/2017 | Cui et al. | |
| 2017/0307736 A1 | 10/2017 | Donovan | |
| 2018/0259623 A1 | 9/2018 | Donovan | |
| 2019/0107623 A1 | 4/2019 | Campbell et al. | |
| 2019/0250254 A1 | 8/2019 | Campbell et al. | |
| 2019/0310375 A1* | 10/2019 | Finkelstein | G01S 7/4868 |
| 2020/0200874 A1 | 6/2020 | Donovan | |
| 2020/0341144 A1* | 10/2020 | Pacala | G01S 17/894 |

OTHER PUBLICATIONS

Maksymova, et al., "Review of LiDAR Sensor Data Acquisition and Compression for Automotive Applications", Proceedings, vol. 2, No. 13; Retrieved from https://doi.org/10.3390/proceedings2130852, Dec. 6, 2018, 4 pages.

Yoo, et al., "MEMS-Based Lidar for Autonomous Driving", Elektrotechnik und Informationstechnik, vol. 135, No. 6, pp. 4 408-415; Retrieved from https://doi.org/10.1007/s00502-018-0635-2, Jul. 31, 2018, 8 pages.

"Extended European Search Report", EP Application No. 21184162. 2, dated Dec. 7, 2021, 12 pages.

Communication pursuant to Article 94(3) EPC issued Jan. 16, 2024 in European Application No. 21184162.2.

* cited by examiner

DETECTION OF PULSE TRAINS BY TIME-OF-FLIGHT LIDAR SYSTEMS

BACKGROUND

Automotive lidar systems use laser pulses to determine the speed and distance of stationary and moving objects (e.g., other vehicles, pedestrians, obstacles). To make these measurements, emitted lidar pulses are compared to their reflected lidar return signals. For some safety and autonomous-driving applications, it is desirable to detect lidar returns quickly and accurately for identifying fast-moving targets or targets at long-range. A lidar system may need to increase its laser-power or accommodate longer frame times to capture some objects. Even still, without increasing laser-power or processing speed some lidar systems struggle to detect objects at a range or with a scanning speed that is acceptable for automotive applications.

SUMMARY

This document describes one or more aspects of detection of pulse trains by time-of-flight (TOF) lidar systems. In one example, a lidar system is configured to: emit a pulse train comprising multiple lidar pulses, determine, based on an intensity of at least one lidar pulse in the pulse train, an intensity at which to sample reflections of the pulse train, and identify a lidar return corresponding to the pulse train by sampling the reflections at the intensity determined based on the intensity of the at least one lidar pulse in the pulse train. The lidar system is further configured to output, based on analyzing the lidar return, an indication of at least one of distance or speed associated with an object pixel in a field-of-view.

In another example, a method includes emitting, by a lidar system, a pulse train comprising multiple lidar pulses, determining, by the lidar system and based on an intensity of at least one lidar pulse in the pulse train, an intensity at which to sample reflections of the pulse train, and identifying, by the lidar system, a lidar return corresponding to the pulse train by sampling the reflections at the intensity determined based on the intensity of the at least one lidar pulse in the pulse train. The method further includes outputting, by the lidar system, based on analyzing the lidar return, an indication of at least one of distance or speed associated with an object pixel in a field-of-view.

In another example, a lidar system includes a driver and a laser configured to emit a pulse train comprising a first lidar pulse at a first intensity and a second lidar pulse at a second intensity; a photodetector configured based on a combination of the first and second intensities to detect reflections of the pulse train; and a sampling unit configured to sample the reflections from the photodetector at the combination of the first and second intensities. The lidar system further includes a processor configured to determine, based on the reflections, at least one of distance or speed associated with an object pixel in a field-of-view.

This document also describes means for performing the above-summarized method and other methods set forth herein, in addition to describing methods performed by the above-summarized lidar systems and methods performed by other lidar systems set forth herein.

This Summary introduces simplified concepts detection of pulse trains by TOF lidar systems, which are further described below in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of one or more aspects of detection of pulse trains by TOF lidar systems are described in this document with reference to the following figures. The same numbers are often used throughout the drawings to reference like features and components.

FIG. 3-1 illustrates an example transceiver of the TOF lidar system of FIG. 2.

FIG. 3-2 illustrates an example field-of-view scanned by the TOF lidar system of FIG. 2.

FIG. 3-3 illustrates example transmitters of the TOF lidar system of FIG. 2.

FIG. 3-4 illustrates an example read-out module of the TOF lidar system of FIG. 2.

FIG. 4 illustrates an example method performed by a TOF lidar system configured to detect pulse trains.

FIG. 5-1 illustrates another example transceiver of the TOF lidar system of FIG. 2.

FIG. 5-2 illustrates example pulse trains and corresponding returns processed by a TOF lidar system.

FIG. 6-1 illustrates another example transceiver of the TOF lidar system of FIG. 2.

FIG. 6-2 illustrates another example method performed by a TOF lidar system configured to detect pulse trains.

FIG. 6-3 illustrates additional example pulse trains processed by a TOF lidar system.

DETAILED DESCRIPTION

Overview

Figure 1:
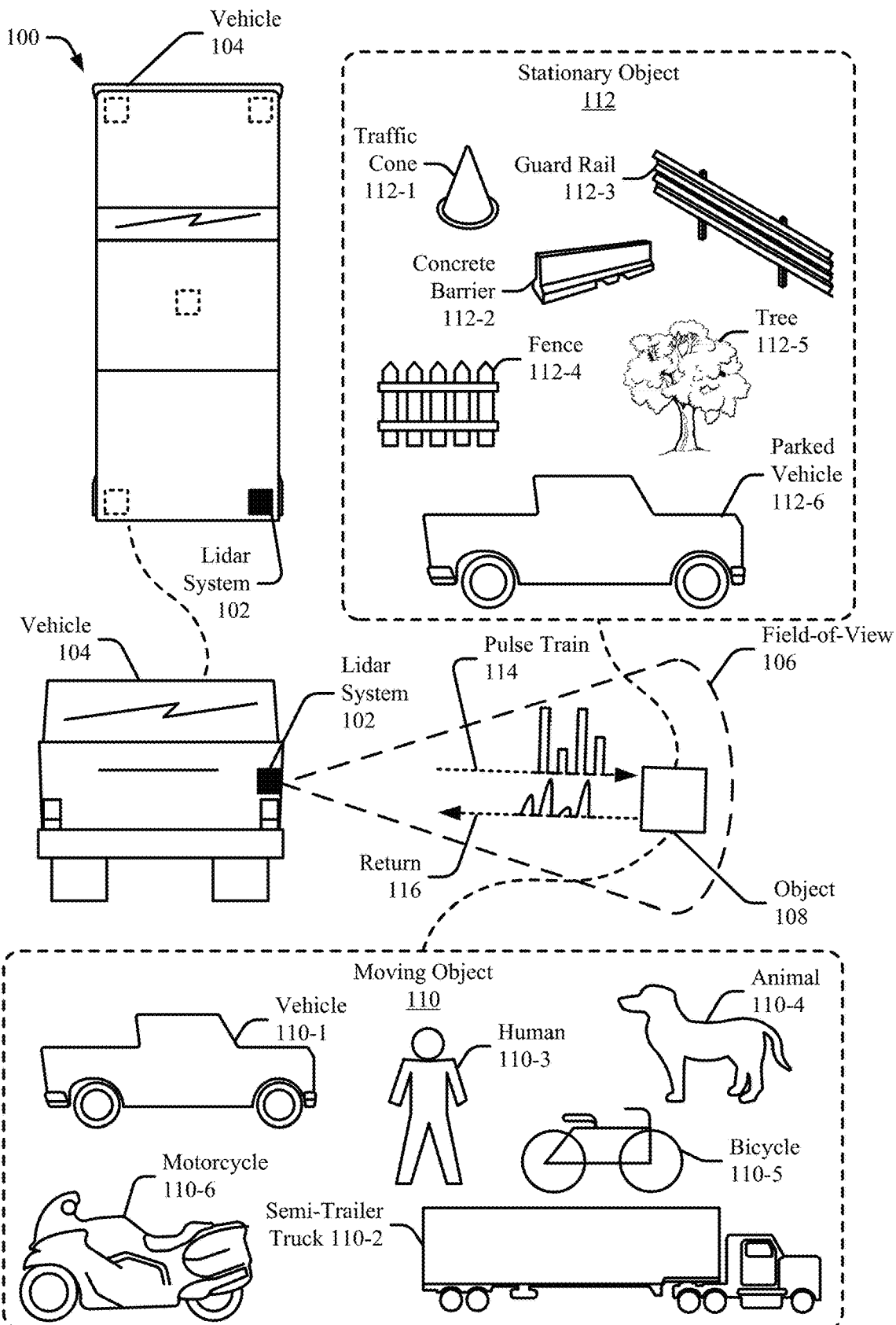
FIG. 1 illustrates an example environment in which a TOF lidar system configured to detect pulse trains can be implemented.

TOF lidar (also referred to as "light detection and ranging") is useful for automotive applications, in part, to measure objects at long distances, whether stationary or moving at high speed. A TOF lidar illuminates a scene and detects a backscattered return signal. A light source (e.g., a laser) outputs a lidar signal including a single laser pulse; in response, a photodetector receives a corresponding return signal (or more simply a "return"). Based on a time delay $\tau$ between the laser pulse and its resulting return, a relative distance R to a target can be determined using the speed of light c, as shown in Equation 1:

$$\tau = \frac{2R}{c}. \qquad \text{Equation 1}$$

In an automobile, a lidar system may emit a laser pulse at each object pixel in a field-of-view, scanning a full scene by obtaining a corresponding return for each laser pulse with a photodetector. The laser pulses include a defined duration, intensity, and repetition rate T. Each pulse may be simultaneously output with a start pulse, which propagates to the photodetector as a time reference for determining a return time of the corresponding return, based on the time delay $\tau$. When the corresponding return reaches the photodetector it creates a specific response, which when sampled based on the time reference using at least one digital converter (e.g., an analog-to-digital converter (ADC), time-to-digital converter (TDC)) is processed digitally into a return time, distance, or speed.

In order to enable detection from long distances, some automotive lidar systems emit laser pulses with long durations, or using high powered lasers, emit laser pulses with high-intensities; the prior reduces pixel throughput and frame rate, while the latter has other drawbacks. More powerful lasers are more expensive and require more energy to operate. In addition, emitting high-intensity laser pulses requires additional safety and thermal considerations, which adds complexity and costs. As autonomous vehicles become more common, lidar systems on automobiles may receive interference from other lidar systems operating on the same or a different automobile. Interference from another lidar system can mask legitimate returns or even be inadvertently processed as a corresponding return, which may cause the lidar system to erroneously treat the interference as a detection.

In contrast to those lidar systems, this document describes a TOF lidar system configured to process pulse trains instead of individual pulses, for improved range resolution and pixel throughput. A pulse train includes a series of lidar pulses, which after reaching an object, reflect as a lidar return with an intensity that mimics that of the pulse train. An array of drivers and/or array of lasers can be configured to emit the pulse train with little to no delay between pulses in the series. Each pulse in the pulse train is output at a respective duration and intensity (e.g., an amount of energy, a power level), which is reflected in an intensity of the return. The intensity is selected to: provoke a return with a high-intensity and low signal ambiguity, prevent thermal build-up, or promote safe ocular operation. Using a longer more intense pattern of intensity to the pulses in the pulse train mitigates signal interference from other nearby lidar sources, and also promotes reliability. The pattern of intensity may be modified from one object pixel to the next, or from one frame to the next, to promote security. The pattern can be determined randomly for example. An expected intensity of the return as a function of time and can be determined. By sampling reflections at the expected intensities, the lidar system quickly identifies a corresponding lidar return, despite external lidar noise. A return time of the return can indicate a distance or speed associated with an object pixel in a field-of-view. Processing pulse trains instead of individual pulses allows object pixels to be scanned faster than using long durations or frame times, which also promotes ocular safety. Increased throughput is realized using low-energy lasers and inexpensive hardware, which minimize thermal footprint. These are just some examples of how techniques and systems described herein may improve TOF lidar systems for automotive applications. This document describes other examples and implementations.

Operating Environment

FIG. 1 illustrates an example environment 100 in which a TOF lidar system 102, which is configured to detect pulse trains, can be implemented. The TOF lidar system 102 (referred to simply as "the lidar system 102") is mounted to, or integrated within, a vehicle 104. The lidar system 102 is capable of detecting an object 108 (or multiple objects) that is in proximity to the vehicle 104. Although illustrated as an automobile, the vehicle 104 can represent other types of motorized vehicles (e.g., a motorcycle, a bus, a tractor, a semi-trailer truck, construction equipment), non-motorized vehicles (e.g., a bicycle), railed vehicles (e.g., a train, a trolley car), watercraft (e.g., a boat, a ship), aircraft (e.g., an airplane, a helicopter), or spacecraft (e.g., satellite). In some cases, the vehicle 104 can tow or include a trailer or other attachments. In general, manufacturers can mount the lidar system 102 to any moving platform, including moving machinery or robotic equipment.

Figure 2:
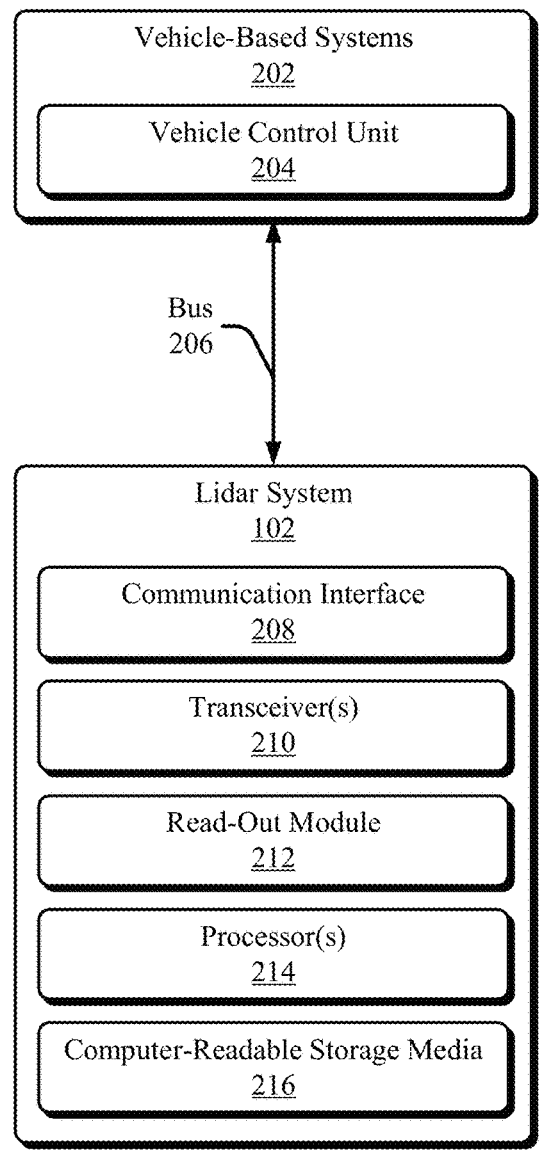
FIG. 2 illustrates an example implementation of the TOF lidar system of FIG. 1 as part of a vehicle.
Figures 1, 3:
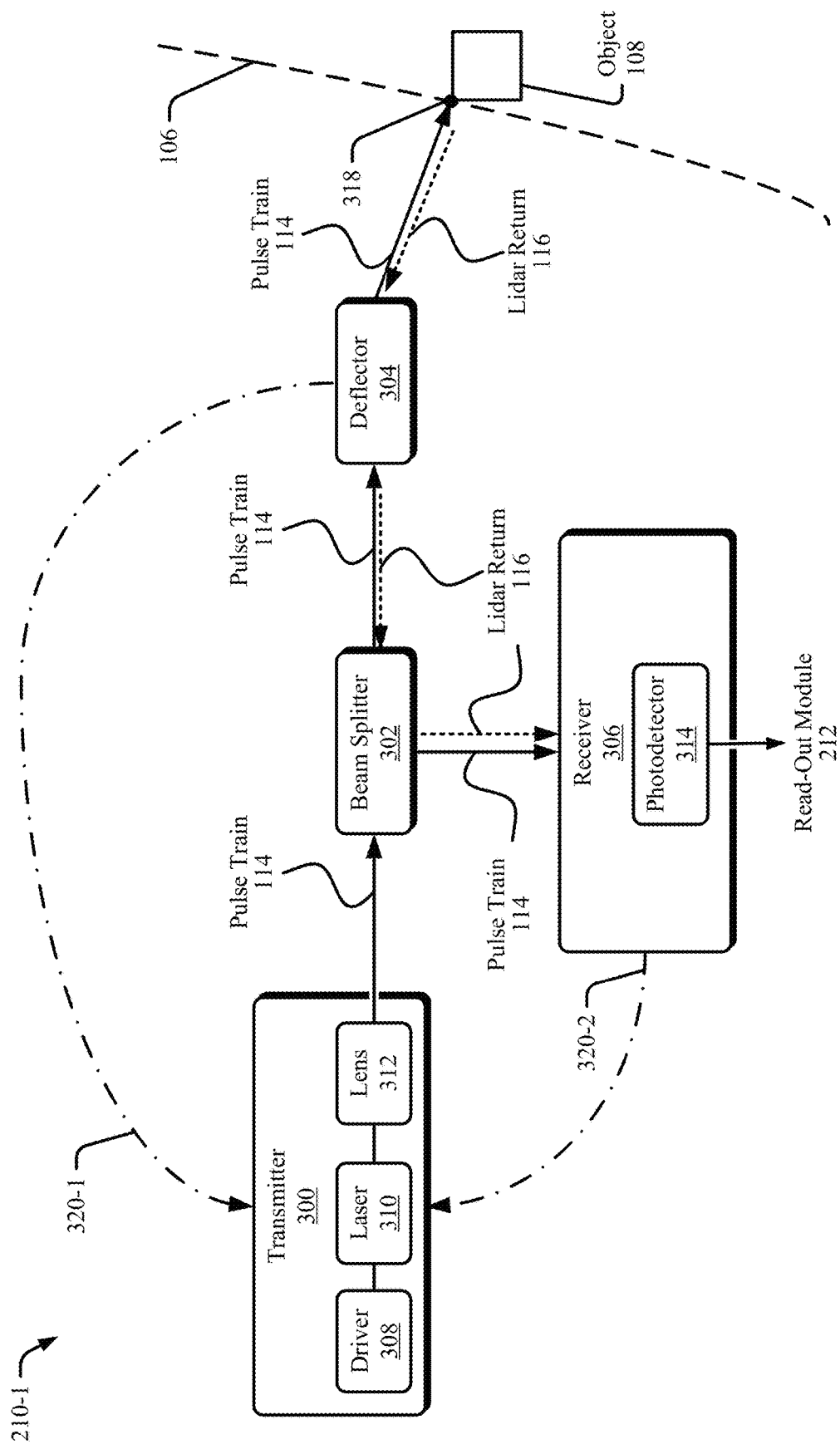
Figures 2, 3:
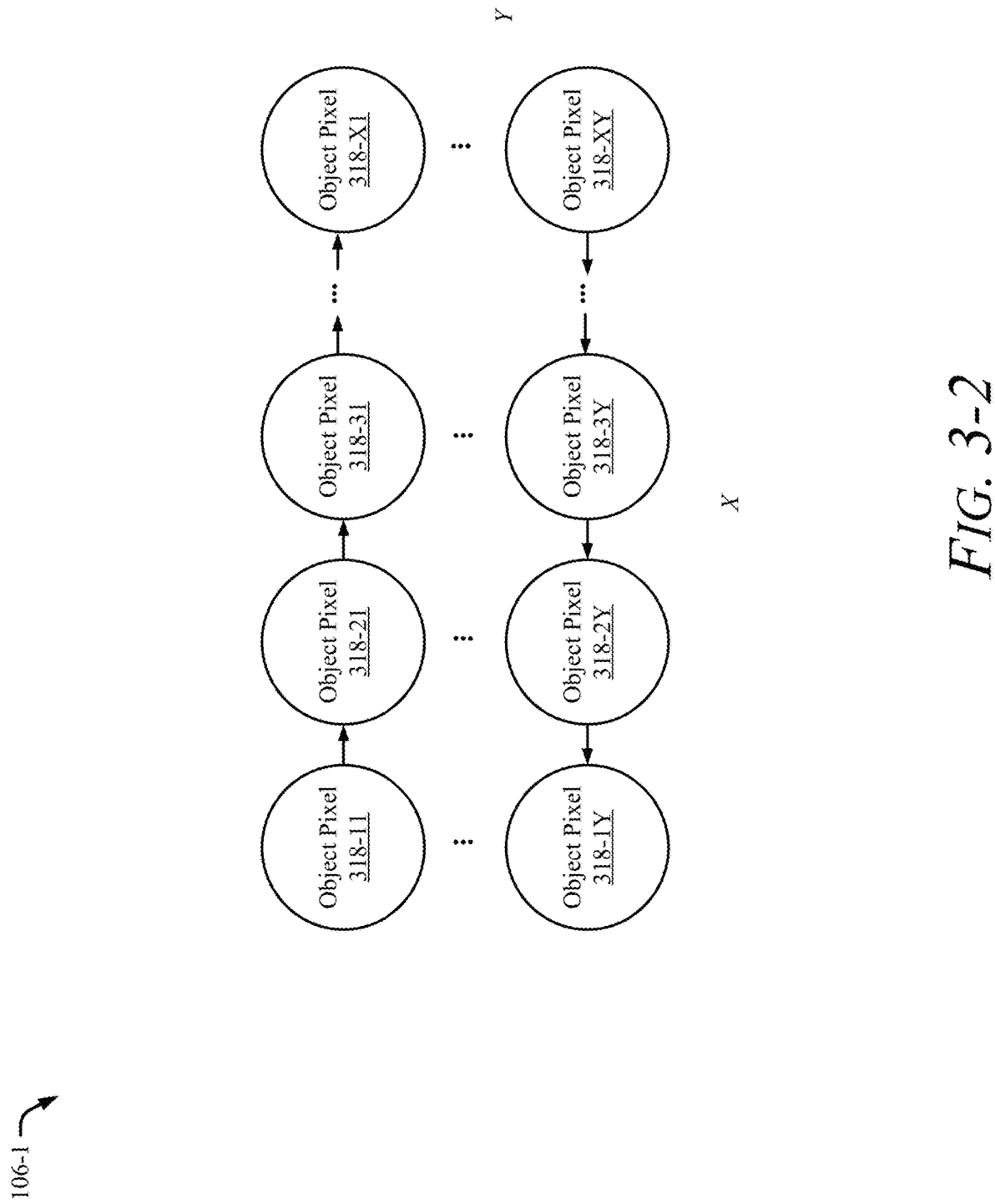
Figure 3:
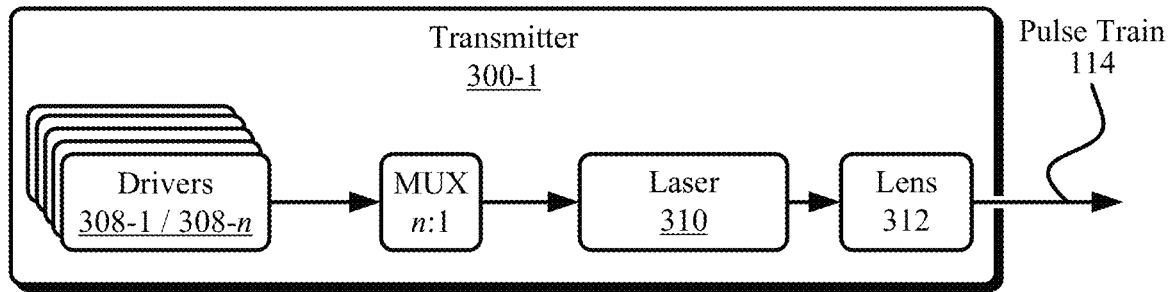
Figure 3:
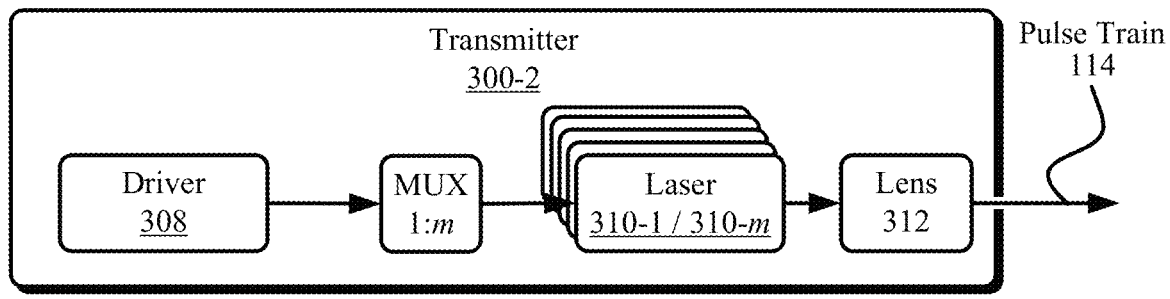
Figure 3:
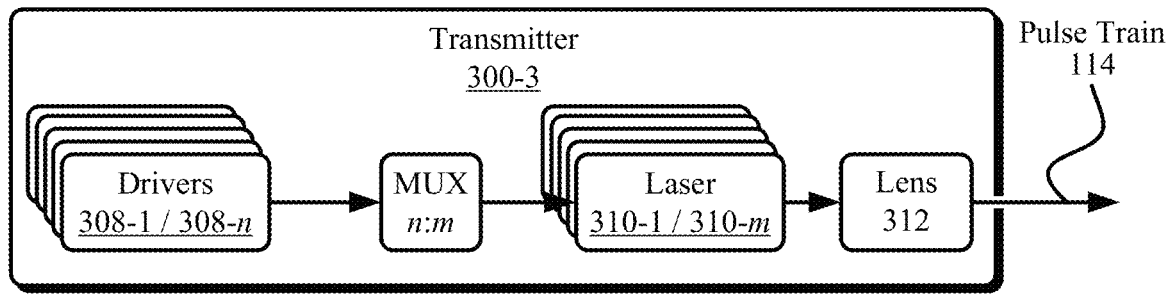

In the depicted implementation, the lidar system 102 is mounted on a rear quarter section of the vehicle 104 and provides a field-of-view 106 illuminating the object 108 by emitting a pulse train 114 and receiving a corresponding return 116 (lidar return 116). The lidar system 102 can be mounted to and project the field-of-view 106 from any other portion or portions of the vehicle 104. For example, vehicle manufacturers can integrate the lidar system 102 into a roof, a bumper, a side mirror, or any other interior or exterior location where the distance or classification of the object 108 requires detection. In some cases, the vehicle 104 includes multiple lidar systems 102, such as a first lidar system and a second lidar system that together provide a larger field-of-view 106, or inputs to different vehicle subsystems. In general, vehicle manufacturers can select the location(s) of the lidar systems 102 to provide a particular field-of-view 106 that encompasses a region of interest in which the object 108 may be present. The lidar system 102 divides the field-of-view 106 into object pixels (as illustrated in FIG. 3-2).

The object 108 is composed of one or more materials that reflect lidar signals. Depending on the application, the object 108 can represent a target of interest. In some cases, the object 108 is a moving object 110, such as another vehicle 110-1, a semi-trailer truck 110-2, a human 110-3, an animal 110-4, a bicycle 110-5, or a motorcycle 110-6. In other cases, the object 108 represents a stationary object 112, such as a traffic cone 112-1, a concrete barrier 112-2, a guard rail 112-3, a fence 112-4, a tree 112-5, or a parked vehicle 112-6. The stationary object 112 can be continuous (e.g., the concrete barrier 112-2, the guard rail 112-3) or discontinuous (e.g., the traffic cone 112-1) along a portion of the road.

In contrast to other lidar systems, the lidar system 102 is configured to process the pulse train 114 instead of an individual pulse, for improved range resolution and pixel throughput. As a TOF lidar system, the lidar system 102 transmits and receives lidar signals including pulses for each object pixel being scanned in the field-of-view 106. The lidar system 102 measures a distance to the object 108 based on the time it takes for a pulse to travel from the lidar system 102 to the object 108, and for a reflection of the pulse to travel from the object 108 back to the lidar system 102. Instead of scanning each object pixel in the field-of-view 106 with a single pulse, the lidar system 102 scans each object pixel with the pulse train 114. The pulse train 114 includes a series of lidar pulses, each with a specific intensity. The lidar pulses of the pulse train 114 can be considerably shorter in duration than a typical lidar pulse because the lidar system 102 is not waiting for each previous pulse to return. When the series of lidar pulses is output, the pulse train 114 has a pattern of intensity that changes over time, from an intensity of one lidar pulse to an intensity of a next lidar pulse in the series. The lidar system 102 is configured to detect a lidar return 116 by sampling reflections at the expected pattern of intensity of the pulse train 114. After detecting the lidar return 116, the lidar system 102 scans the next object pixel in the field-of-view 106 by emitting another pulse train 114 analyzing its corresponding return 116.

The lidar system 102 can also measure reflective properties of the object 108 based on an intensity or an amount of energy of the return 116, which is also referred to as "a reflection". Information about this energy can be used to classify the object 108. As an example, the lidar system 102 can determine whether the object 108 is a parked vehicle 112-6, a lane marker, a surface of a road, or a human 110-3. The energy information also enables the lidar system 102 to determine a characteristic of the object 108, such as a material composition of the object 108.

For each object pixel in the field-of-view 106, the lidar system 102 can emit the same or different pulse train 114, which includes several pulses in a short amount of time. Two or more pulses of the pulse train 114 can at least partially overlap in-time; other pulses in the pulse train 114 may be output sequentially, one after another, with or without a delay from one pulse to the next. In either case, the lidar system 102 can emit the entire pulse train 114 without having to wait for the return 116, which may shorten the amount of time it takes to scan an object pixel. This results in an improvement to pixel throughput.

Following each transmission or output of the pulse train 114, information is maintained about timing and intensity of the pulse train 114, including the timing or intensity of each individual pulse. The lidar system 102 can configure a transceiver to resolve the return 116 for each pulse in the pulse train 114 using this information, in various ways. The lidar system 102 and the vehicle 104 are further described with respect to FIG. 2.

FIG. 2 illustrates the lidar system 102 as part of the vehicle 104. The vehicle 104 includes a wired or wireless bus 206 and at least one vehicle-based system 202 communicatively coupled to the lidar system 102 via the bus 206. The vehicle-based system 202 or any other component connected to the bus 206 can rely on data output from the lidar system 102. For example, a vehicle control unit 204 is configured to manage a driver-assistance or autonomous-driving system based on information received from the lidar system 102 about the object 108. Generally, the vehicle-based systems 202 use lidar data provided by the lidar system 102 to perform a function. For example, a driver-assistance system provides blind-spot alerting to a potential collision with the object 108 when the object 108 enters the field-of-view 106. In this case, the lidar data from the lidar system 102 indicates when it is safe or unsafe to change lanes.

The lidar system 102 includes a communication interface 208 configured to transmit the lidar data over the bus 206 to the vehicle-based systems 202 or another component of the vehicle 104. In general, the lidar data provided by the communication interface 208 is in a format usable by the vehicle-based systems 202. In some implementations, the communication interface 208 can receive information from the vehicle-based systems 202, such as the speed of the vehicle 104 or an indication of whether a turn blinker is on or off. The lidar system 102 may use this information to configure itself appropriately. For example, the lidar system 102 can adjust its frame rate, scanning speed, or intensity of the pulse train 114 based on the speed of the vehicle 104. Alternatively, the lidar system 102 can dynamically adjust the field-of-view 106 based on whether a right-turn blinker or a left-turn blinker is on.

The lidar system 102 also includes a transceiver(s) 210 configured to emit lidar signals and receive corresponding lidar returns. Although shown as a single component, the transceiver 210 can be multiple components, including shared or separate transmitter and receiver components, as shown in the later Figs. The transceiver 210 components can be incorporated together on the same integrated circuit (e.g., a transceiver integrated circuit) or separately on different integrated circuits. The transceiver 210 includes elements, whether optical or otherwise, for emitting lidar signals and related components for directing the lidar signals.

The transceiver 210 can have a mono-static configuration with an optics design sharing a common deflector to scan the entire field-of-view 106 and steer the pulse train, at a particular object pixel. The transceiver 210 can form beams that are steered or un-steered, and wide or narrow. The steering and shaping can be achieved through analog beamforming or digital beamforming. The transceiver 210 includes one or more photodetector arrays (collectively, referred to as a photodetector) to detect lidar returns 116. The photodetector can be implemented as a silicon photomultiplier (SiPM), an avalanche photo diode (APD), a single-photon avalanche diode (SPAD), a photomultiplier tube (PMT), a PIN diode, and the like. A PIN diode includes an undoped intrinsic semiconductor region in between a p-type and n-type semiconductor region.

The transceiver 210 is configured to emit an entire lidar pulse train 114 in a shorter amount of time than some other lidar systems can emit a single lidar pulse. By varying the timing or intensity of the lidar pulse train 114 and maintaining information about the variations after emission of the pulse train 114, the transceiver 210 can immediately resolve the return 116 that results from the emission of the lidar pulse train 114. The identification of the return 116 occurs despite noise, including noise from other lidar systems, in part because of an intensity of the pulses in the pulse train 114. As such, an object pixel can be scanned in a shorter amount of time and with greater reliability than if other transceivers are used, which wait to emit each subsequent lidar pulse until a return of a recent lidar pulse is resolved.

The lidar system 102 also includes a read-out module 212. The read-out module 212 provides an interface between the transceiver 210 and the processor 214. In some implementations, the read-out module 212 is incorporated within the transceiver 210 and implemented on the same integrated circuit. The read-out module 212, however, may be separate from the transceiver 210 and implemented on a different integrated circuit (or multiple integrated circuits), and in some implementations, at least a portion of the read-out module 212 can be implemented by the processor 214.

Generally, the read-out module 212 extracts information from analog signals output by the transceiver 210 and generates digital information for the processor 214. The information can include information about an intensity of a return and provide an intensity read-out function. The read-out module 212 can include a timing function, which generates timing data related to the TOF for the return, for example, times associated with a voltage or current of a pulse in a return signal being greater than, equal to, or less than a threshold value set for determining a return time.

The read-out module 212 may maintain information about timing and intensity of a pulse train 114, including information about the individual width, timing, intensity, or quantity of pulses in the pulse train. These pulse-level timing and intensity characteristics can be compared against timing and intensity characteristics of a return 116. From the comparisons, the read-out module 212 can identify each individual lidar return 116 that corresponds to the pulse train 114 and eliminate external noise attributed to other lidar systems. Lidar returns 116 that do not match an expected timing or intensity associated with the pulse train 114 are discarded, while remaining lidar returns 116 with timing or intensity characteristics that fit the expected patterns are sampled.

The lidar system 102 also includes one or more processors 214 and computer-readable storage media (CRM) 216. The processor 214 can be implemented as a microprocessor or a system-on-chip. The processor 214 executes instructions that are stored within the CRM 216. As an example, the processor 214 can determine a location of the object 108 (of FIG. 1) relative to the lidar system 102 (e.g., determine a slant range, azimuth, elevation to the object 108), determine the material composition of the object 108, or classify the object 108. In general, the processor 214 determines characteristics of the object 108 based on information provided by the transceiver 210 or the read-out module 212. The processor 214 may generate lidar data for the vehicle-based systems 202.

Example Architecture

FIG. 3-1 illustrates transceiver 210-1, which is an example of the transceiver 210 of the lidar system 102. The transceiver 210-1 is configured to scan each of the object pixels 318 in the field-of-view 106, which in this case, is aligned with the object 108. As a reference, FIG. 3-2 illustrates the object pixels 318 scanned by the lidar system 102 during a frame (not shown). The field-of-view 106-1 includes the object pixels 318-11, 318-21, 318-31, . . . , 318-X1, . . . , 318-XY, 318-3Y, 318-2Y, 318-1Y, and all other object pixels scanned during the frame. The object pixels 318 are shown arranged in an X-pixel-wide-by-Y-pixel-high grid and are scanned individually in the order indicated by the arrows, one row (or column) at a time, although other orders for scanning the object pixels 318 are possible.

Referring back to FIG. 3-1, the transceiver 210-1 includes a transmitter 300, a beam splitter 302, a deflector 304, and a receiver 306. Within the transmitter 300, the transceiver 210-1 includes a driver 308, a laser 310, and a lens 312. The receiver 306 includes a photodetector 314.

Also shown in FIG. 3-1 is an optional feedback loop 320-1 or 320-2; either of which enable control over the intensity of the pulse train 114 based on the position of the deflector 304 or intensity of the return 116. For example, as described later on regarding ocular safety in FIG. 7, an intensity of the return 116 from a nearby object 108 may be unnecessarily high; lowering the intensity of the pulse train 114 may provide sufficient detection for object ranging and classification, while emitting light within limits for eye safety.

The laser 310 is focused through the lens 312 and the beam splitter 302 and onto a spot of the deflector 304 that is aligned with the object pixel 318. The transmitter 300 is configured to emit the pulse train 114 by driving the laser 310. The driver 308 excites the laser 310 to output the pulse train 114 through the lens 312. The beam splitter 302 directs the pulse train 114 to a spot on the deflector 304. The beam splitter 302 also outputs an indication of the pulse train 114 to the receiver 306. The photodetector 314 is configured to extract the return 116 from the beam splitter 302 as the beam splitter 302 receives the return 116 from the deflector 304.

The photodetector 314 is configured to identify, based on the specific timing pattern and pattern of intensity of the pulse train 114, a matching return 116. The pulse train 114 can change from one object pixel in the field-of-view 106 to the next and the photodetector 314 is configured to accommodate the change. For example, scanning a first pixel may include emitting a first pulse train including a first set of pulses directed to a first object pixel in the field-of-view 106. Then after receiving a corresponding return 116, the deflector 304 moves to a next object pixel in the field-of-view 106 where the transmitter 300 is configured to emit the same or different pulse train 114 including a second series of pulses directed to the next object pixel in the field of view 106.

FIG. 3-3 illustrates transmitters 300-1, 300-2, and 300-3, as examples of the transmitter 300 of the transceiver 210-1. Each of the transmitters 300-1, 300-2, and 300-3 is configured to output the pulse train 114 from the lens 312. Differences between the transmitters 300-1, 300-2, and 300-3 are in the quantity of drivers and in the quantity of lasers that each uses to generate the pulse train 114.

Each of the transmitters 300-1, 300-2, and 300-3 enables fast scanning of individual frames of the object pixels 318, while lowering signal interference, particularly from external lidar systems. The transmitters 300-1, 300-2, and 300-3 use multiple lasers or multiple drivers to emit a lidar signal with an intensity, which is shaped for each specific pixel. By using several lasers or drivers, the time between two pulses within the pulse train 114 can be very short. An issue some other TOF lidar systems have with a limited pixel throughput and signal interference is overcome using arrays of lasers or drivers.

The emitted light of the pulse train 114 is deflected via the deflector 304, which is a common deflector within what is a mono-static optical path from the lens 312 and through the beam splitter 302. The returned light of the return 116 is detected by the photodetector 314, which may be a shared photodetector array. The photodetector 314 is configured to match the return 116 with a respective pulse train 114 of a particular pixel 318, which the return 116 originally stems from. The transmitters 300-1, 300-2, and 300-3 use multiple lasers or drivers, which allow the transceiver 210-1 to output pulses in the pulse train 114 in very short time periods, and by varying intensity of the pulse train 114, targeting multiple pixels in a same angle using the deflector 304.

The transmitter 300-1 includes multiple drivers 308-1 through 308-$n$ (where n is any integer greater than two) coupled to a single laser 310. The drivers 308-1 through 308-$n$ may be collectively referred to as "an array of drivers 308". Each of the multiple drivers 308-1 through 308-$n$ drives the laser 310 to a respective level of intensity. The transmitter 300-1 is configured to emit the pulse train 114 with a particular pattern of intensity by selectively driving the laser 310 with a different driver from the multiple drivers 308-1 through 308-$n$.

The transmitter 300-2 includes a single driver 308 coupled to multiple lasers 310-1 through 310-$m$ (where m is any integer greater than two). The lasers 310-1 through 310-$n$ may be collectively referred to as "an array of lasers 310". Each of the multiple lasers 310-1 through 310-$m$ is driven by the driver 308. The transmitter 300-2 is configured to emit the pulse train 114 by selectively driving a combination of one or more of lasers 310-1 through 310-$m$ over time to achieve a particular pattern of intensity.

The transmitter 300-3 is a combination of the transmitters 300-1 and 300-2. The transmitter 300-3 includes an array of drivers 308-1 through 308-$n$ coupled to an array of lasers 310-1 through 310-$m$. The transmitter 300-3 is configured to emit the pulse train 114 by selectively driving a combination of one or more of lasers 310-1 through 310-$m$ with a different driver from the multiple drivers 308-1 through 308-$n$ over time to achieve a particular pattern of intensity.

Referring back to FIG. 3-1, from the indication of the pulse train 114, the receiver 306 is configured to determine an intensity at which to sample reflections. The receiver 306 adjusts the photodetector 314 to sample reflections at a same or similar intensity as the pulse train 114. In response to the pulse train 114 reflecting off the object 108 and the intensity of the lidar return 116 matching the expected intensity, the receiver 306 is configured to output an indication of the pulse train 114 and the lidar return 116 to the read-out module 212.

The receiver 306 includes at least one photodetector 314. Although not explicitly shown, the receiver 306 can include other elements, such as an amplifier. The photodetector 314 detects the reflected return 116 by collecting photons. The photodetector 314 converts the photons into an analog current flow. In the case of the photodetector 314 being an APD or SPAD, the photodetector 314 pulls electrons created by photon absorption towards a multiplication area where a photon-induced electron is amplified to create a breakdown avalanche of multiplied electrons. In a linear-output region of the photodetector 314, the output of the photodetector linearly increases based on the number of incident photons in a portion of the return 116. As the number of photons incident on the photodetector 314 increases, the output of the photodetector becomes non-linear and is not proportional to the number of photons received. In the non-linear region of the photodetector 314, the accuracy of range and reflectivity determinations by the lidar system 102 decreases because the lidar system 102 may not be able to determine the TOF or the intensity information for the return 116.

The receiver 306 adjusts the sensitivity of the photodetector 314 to detect photons in the return 116 by changing a bias voltage of the photodetector 314. An increase of the bias voltage increases the sensitivity of the photodetector 314 to a return 116 with low energy (e.g., reflected by an object 108 at a great distance from the lidar system 102 or with a low-reflectivity). Similarly, a decrease of the bias voltage decreases the sensitivity of the photodetector 314 to a return 116 with high energy. The receiver 306 can adjust the sensitivity of the photodetector 314 to detect photons in the return 116 with a pattern of intensity corresponding to that of the pulse train 114.

Figures 3, 4:
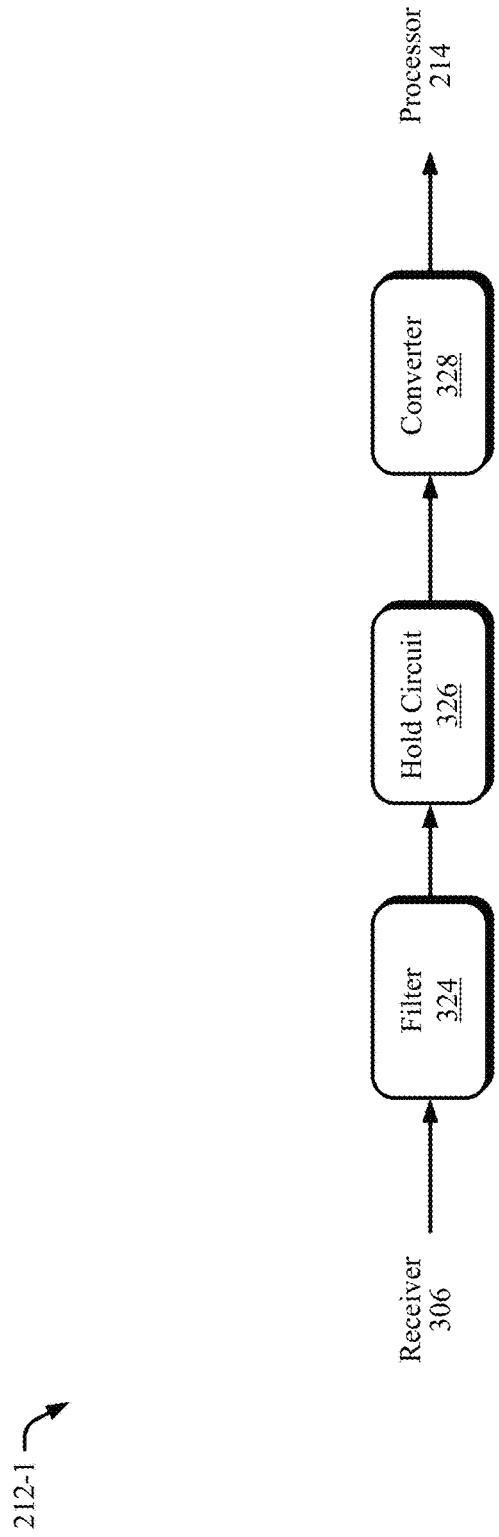
Figure 4:
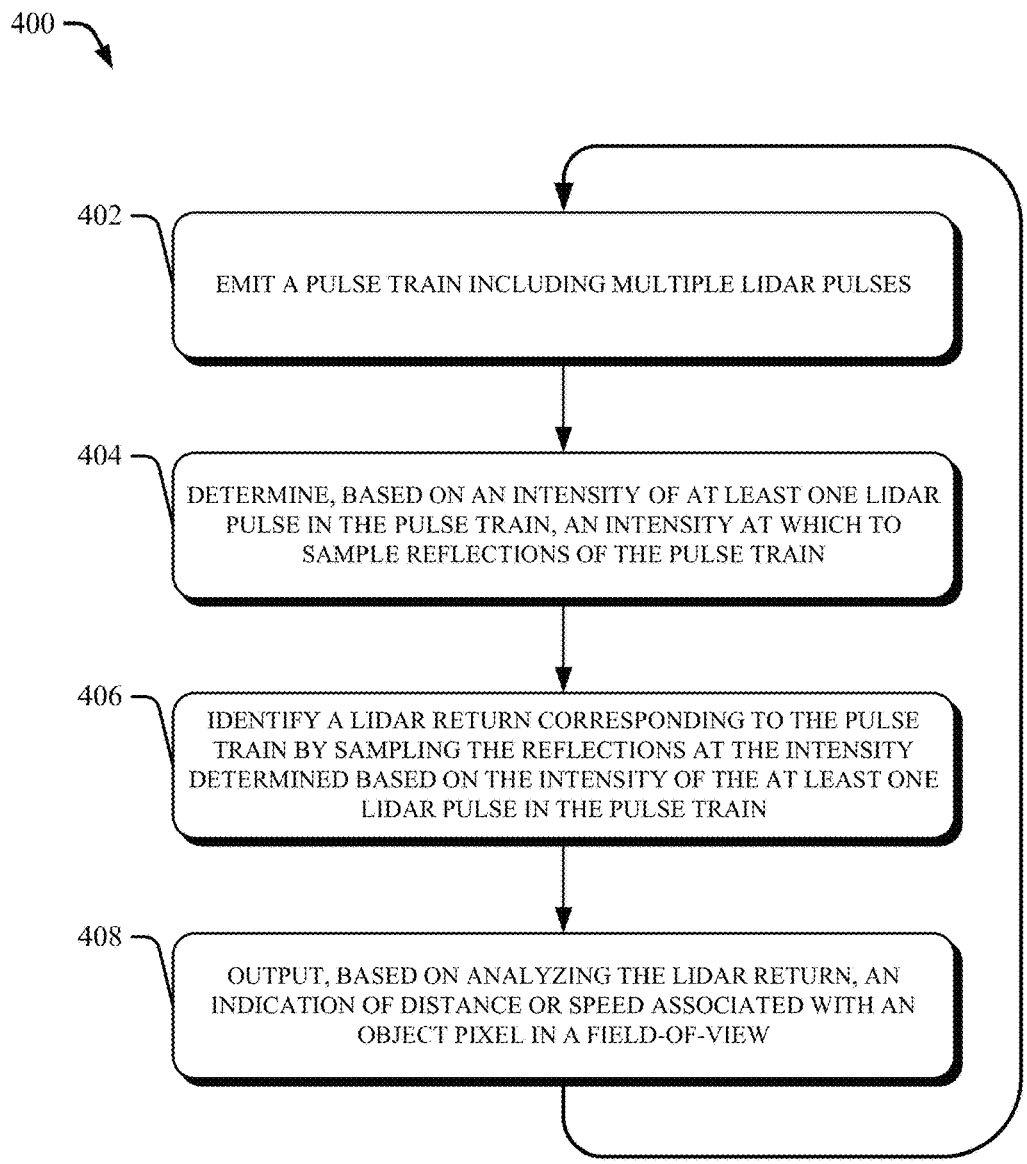

FIG. 3-4 illustrates read-out module 212-1, as an example of the read-out module 212 from FIG. 2. FIG. 3-4 is described in the context of transceiver 210-1 from FIG. 3-1.

The read-out module 212-1 extracts information from the analog current-flow output by the receiver 306 and generates digital information for the processor 214. As described above with respect to FIG. 2, the read-out module 212-1 can be incorporated as part of the transceiver 210 or implemented as a separate component in the lidar system 102. The read-out module 212-1 may include a filter 324, a hold circuit 326 and a converter 328.

The filter 324 may be a low-pass filter coupled between the receiver 306 and the hold circuit 326 or the filter 324 may be coupled between the hold circuit 326 and the converter 328. The filter 324 attenuates high-frequency noise. By attenuating the noise, the filter 324 improves a measurement accuracy of the lidar system 102.

The hold circuit 326 is coupled between the receiver 306 and the converter 328. The hold circuit 326 samples the analog signal. In particular, the hold circuit 326 holds the analog signal for a specified duration and samples the signal. The hold duration and sampling rate of the hold circuit 326 can be pre-programmed or controlled by the processor 214. The hold circuit 326 can be implemented, for example, as an integrate-and-hold circuit or a peak-and-hold circuit. An integrate-and-hold circuit measures an amount of charge within a return (e.g., measures an amount of current over time, measures an amount voltage over time) and generates a voltage, which represents the energy of the return. A peak-and-hold circuit measures a peak amplitude of a current or voltage across the return and generates a voltage, which represents the energy of the return.

The converter 328 may include a digital converter (e.g., an ADC, a TDC) and is coupled between the hold circuit 326 and the processor 214. The converter 328 is high-speed to resolve each pulse of the pulse train 114 and to increase range resolution of the lidar system 102. The converter 328 collects one or more samples of the output voltage from the hold circuit 326 and generates data, which indicates a time or intensity of a return. For example, data can represent a scaled quantity of photons received by the photodetector 314 within a return, for a particular time. The data can be output to the processor 214 as a consolidated signal for each of the object pixels 318. For example, data can be collected into a consolidated signal for the return 116 by the converter 328 or another component of the read-out module 212-1, such as a buffer, and then sent to the processor 214 once data for each of the object pixels 318 is collected.

The processor 214 analyzes the data output from the read-out module 212-1 to detect the object 108. The processor 214 can use intensity data to determine a material composition of the object 108 and/or classify the object 108. In addition, the processor 214 can use timing data to measure a distance between the lidar system 102 and the object 108. Information regarding the distance and classification of the object 108 can be provided as lidar data to the vehicle-based systems 202 of FIG. 2.

During operation, the receiver 306 receives the return 116 and provides it to the photodetector 314. The return 116 includes multiple pulses, each corresponding to one of the pulses of the pulse train 114. The photodetector 314 converts photons in the pulses into pulse data. The pulse data represents an analog current-flow response of the photodetector 314 to the pulse in the time domain.

The pulse data can be filtered by the filter 324. The pulse data or the filtered pulse data is input to the hold circuit 326. The hold circuit 326 samples the pulse data or the filtered pulse data and outputs sampled pulse data to the converter 328. The converter 328 converts the sampled pulse data into digital data, which indicates intensity of the return 116 over time.

Example Method

FIG. 4 illustrates an example method 400 performed by a lidar system configured to detect pulse trains. The method 400 is shown as sets of operations (or acts) performed in, but not limited to, the order or combinations in which the operations are shown herein. Further, any of one or more of the operations may be repeated, combined, or reorganized to provide other methods. In portions of the following discussion, reference may be made to the environment 100 of FIG. 1, and entities detailed in FIGS. 1 through 3-4, reference to which is made for example only. The techniques are not limited to performance by one entity or multiple entities.

At 402, the lidar system 102 emits a pulse train including multiple lidar pulses. For example, the transceiver 210 outputs a lidar signal including the pulse train 114, which includes a series of pulses overlapping-in-time or with little-to-no delay between the pulses.

At 404, the lidar system 102 determines, based on an intensity of at least one lidar pulse in the pulse train, an intensity at which to sample reflections of the pulse train. An indication of the pulse train 114 reaches the receiver 306 and the read-out module 212-1. The read-out module 212-1 determines an intensity of the pulse train 114 based intensity data inferred from the indication of the pulse train 114. For example, the pulse train 114 may include a first pulse at a low level of intensity and a second pulse at a high level of intensity. The read-out module 212-1 determines an expected intensity for a first portion of the return 116 based on the low-level of intensity of the first pulse and an expected intensity for a second portion of the return 116 based on the high-level of intensity of the second pulse. The read-out module 212-1 may configure the receiver 306 or the photodetector 314 to sample reflections that are at or near the expected intensity for the return 116.

At 406, the lidar system 102 identifies a lidar return corresponding to the pulse train by sampling the reflections at the intensity determined based on the intensity of the at least one lidar pulse in the pulse train. For example, with the receiver 306 or the photodetector 314 tuned by the read-out module 212-1, the receiver 306 receives reflections at or near the expected intensity for the return 116 as the deflector receives the return 116. The read-out module 212-1 samples the data received in response to the reflections to determine an intensity and time of the return 116.

At 408, the lidar system 102 outputs, based on analyzing the lidar return, an indication of distance or speed associated with an object pixel in a field-of-view. For example, the read-out module 212-1 outputs the intensity and time data associated with the return 116 to the processor 214. The processor 214 determines a return time based on the intensity and time data of the return 116, and from the return time, determines a distance or speed of one of the object pixels 318 in the field-of-view 106.

Example Pulse Trains

Figures 1, 5:
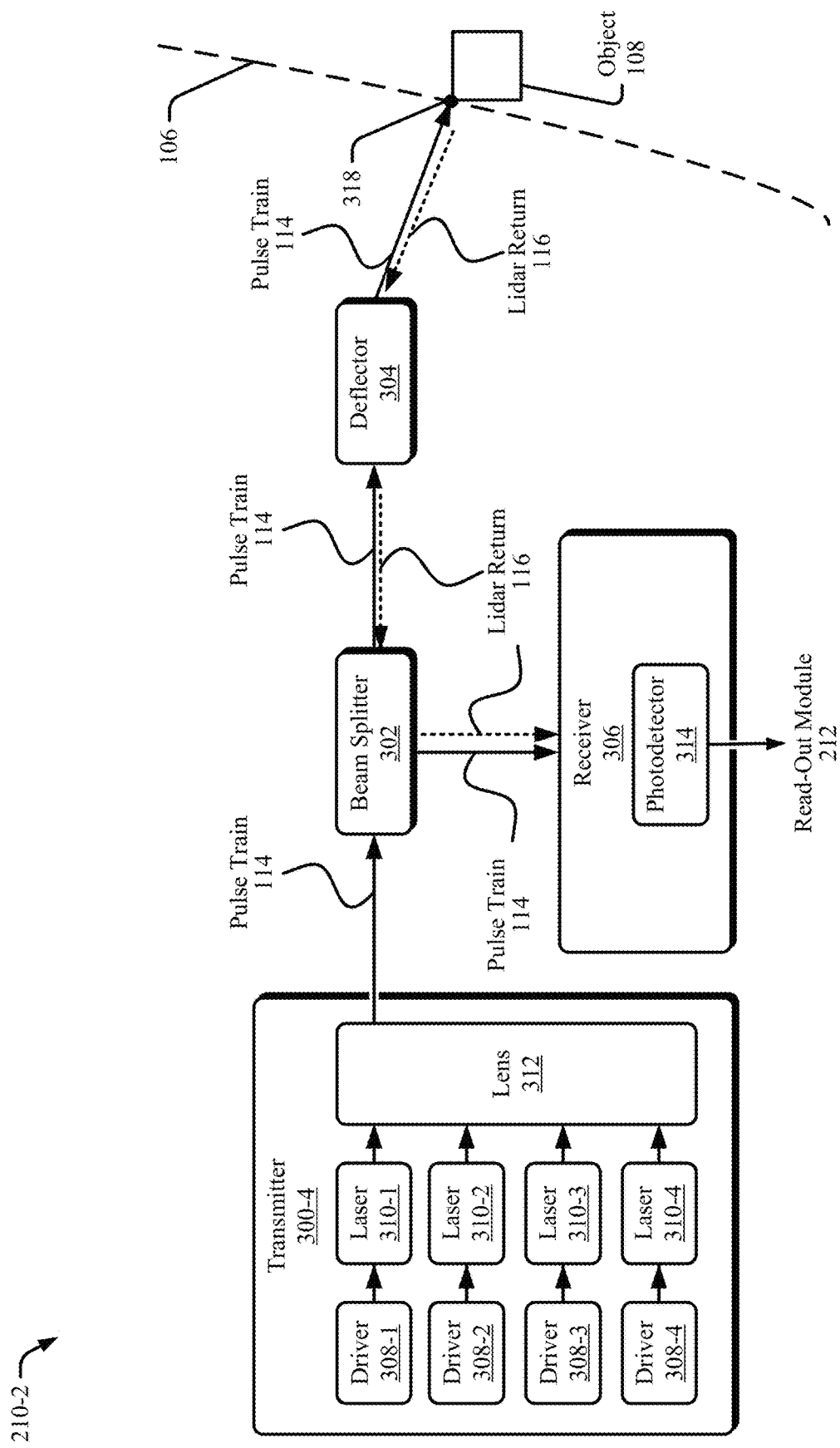
Figures 2, 5:
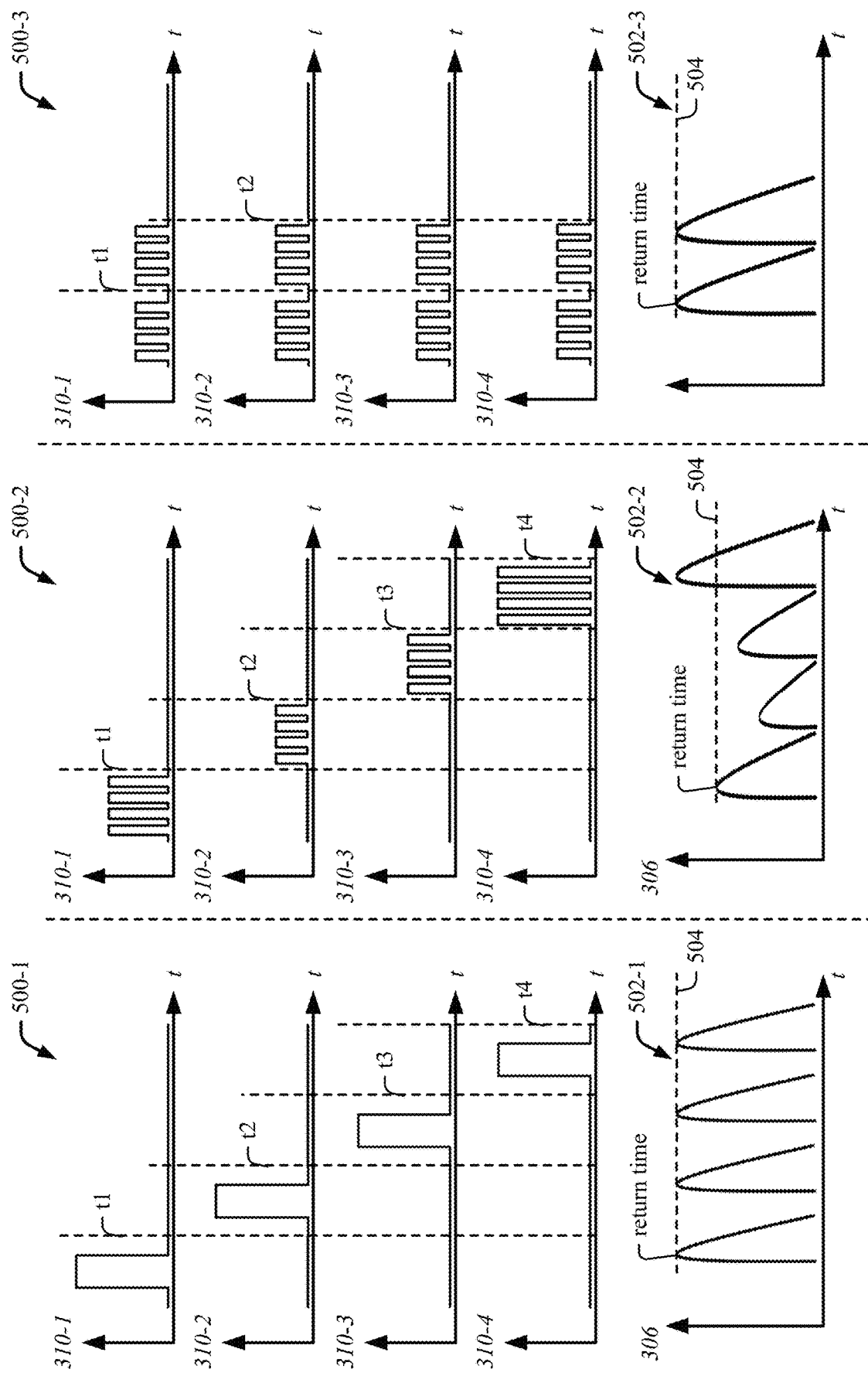

FIG. 5-1 illustrates transceiver 210-2, which is another example transceiver of the lidar system 102. The transceiver 210-2 is identical to the transceiver 210-1 except that the transmitter 300 is replaced by a transmitter 300-4. The transmitter 300-4 includes four drivers 308-1 through 308-4, with each of the drivers 308-1 through 308-4 being configured to drive one of four lasers 310-1 through 310-4. The driver 308-1 and the laser 310-1 emit light through the lens 312 at a first level of intensity. The driver 308-2 and the laser 310-2 emit light through the lens 312 at a second level of intensity. The driver 308-3 and the laser 310-3 emit light through the lens 312 at a third level of intensity. The driver 308-4 and the laser 310-4 emit light through the lens 312 at a fourth level of intensity. Two or more of the drivers 308-1 through 308-4 and the lasers 310-1 through 310-4 may emit light at a same or different level of intensity. The transmitter 300-4 may emit the pulse train 114 based on light emitted by any combination of the lasers 310-1 through 310-4.

FIG. 5-2 illustrates example pulse trains and corresponding returns processed by the lidar system 102 using the transceiver 210-2. The pulse trains shown in the FIG. 5-2 are some example pulse trains, and other variations and combinations can be used. In general, characteristics (e.g., pulse width, pulse duration, pulse quantity) of a pulse train are selected to enable fast scanning of individual frames of the field-of-view 106, while lowering signal ambiguity. An intensity from each pulse in the pulse train totals to an amount of energy sufficient to detect long-range targets at far distances with a sufficient intensity in the return 116. The longer the pulse duration, greater the pulse width or greater the quantity of pulses, the more energy associated with a pulse train.

FIG. 5-2 shows a portion 500-1 of the pulse train 114 output by the lasers 310-1 through 310-4, and a corresponding portion 502-1 of the return 116 received at the input to the receiver 306. Also shown is another portion 500-2 of the pulse train 114 output by the lasers 310-1 through 310-4, and another corresponding portion 502-2 of the return 116 received at the input to the receiver 306. Lastly, FIG. 5-2 shows a portion 500-3 of the pulse train 114 output by the lasers 310-1 through 310-4, and a corresponding portion 502-3 of the return 116 received at the input to the receiver 306. The transceiver 210-2 outputs each pulse in the pulse train 114 at a respective duration and intensity, which may vary to: provoke the return 116 with a high-intensity and low signal ambiguity, prevent thermal build-up, or promote safe ocular operation.

Timing of the pulses and the intensity of each pulse in a pulse train 114 can be specifically adjusted for each object pixel 318 to introduce a particular emission pattern in a frame. By using several lasers or separate drivers for one laser, the time between two pulses in a pulse train 114 can be very short. This pattern is resolved by the receiver 306, the photodetector 314, or the read-out module 212, any of which may be configured to identify the object pixel 318 the return originally stems from.

The portion 500-1 of the pulse train 114 includes four pulses of equal size in width and amplitude, with little to no delay between them. The transceiver 210-2 is configured to output the portion 500-1 between times zero and t4, with the laser 310-1 outputting a pulse before time t1, the laser 310-2 outputting a pulse before time t2, and so forth. The portion 502-1 of the return 116 is received at an expected intensity 504 determined based on the intensity of the pulse train 114.

The portion 500-2 of the pulse train 114 includes four periods or sets of pulses between times zero and t4, with each period including four pulses of equal size in width and amplitude, with little to no delay between them. Each period or set of pulses contains a time and intensity pattern likely to give the return 116 a high level of intensity and little signal interference. The transceiver 210-2 is configured to output the portion 500-2 between the times zero and t4, with the laser 310-1 outputting four pulses before time t1, the laser 310-2 outputting four lower energy pulses before time t2, the laser 310-3 outputting four mid-level energy pulses before time t3, and the laser 310-4 outputting four higher energy pulses before time t4. The portion 502-2 of the return 116 is initially received at an expected intensity 504 determined based on the intensity of the first four pulses in the pulse train 114.

From emitting the portion 500-2 of the pulse train 114, a return 116 has a total intensity proportionate to a sum of the intensities of all the pulses within the pulse train 114. The signal-to-noise-ratio of the return 116 can be increased by emitting a pulse train 114 with pulses that have a greater amount of energy. This allows an accurate estimation of the return time of the pulse train 114.

Lastly, the portion 500-3 of the pulse train 114 includes two periods between times zero and t2, with each period including four low-energy pulses of equal size in width and amplitude, with little to no delay between them. The transceiver 210-2 is configured to output the portion 500-3 between the times zero and t2. The portion 502-3 of the return 116 is received at an expected intensity 504, which is determined based on the intensity of the low-energy pulses in the corresponding portion 500-3 of the pulse train 114. The intensity or amount of energy associated with the return 116 at the portion 502-3 is proportional to the energy of the pulse train 114 at the corresponding portion 500-3. The total energy of the pulse train 114 is a sum of individual energy outputs from each of the four lasers 310-1 through 310-4. An intensity of the corresponding portion 502-3 of the return 116 is roughly four times greater than an intensity of a return 116 obtained after using only one of the four lasers 310-1 through 310-4. In this approach, each pulse of the pulse train 114 hits the photodetector 314, which has a specific response that is sampled using a single or stacked high-speed ADC and/or TDC. These guarantee a high temporal resolution, enabling an accurate determination of the return time and, therefore, the time delay, distance, or speed to the object 108. The timings of the return 116 are compared to a timing pattern of the pulse train 114 and adjusted if necessary, e.g., to mitigate errors causes by timing-jitter. The intensity of each pulse or the total intensity of all pulses in the pulse train 114 is based on an amount of energy required to induce a return 116 with a sufficient intensity to rise above external noise, and from a target at long distances.

Thermal Protection

Figures 1, 6:
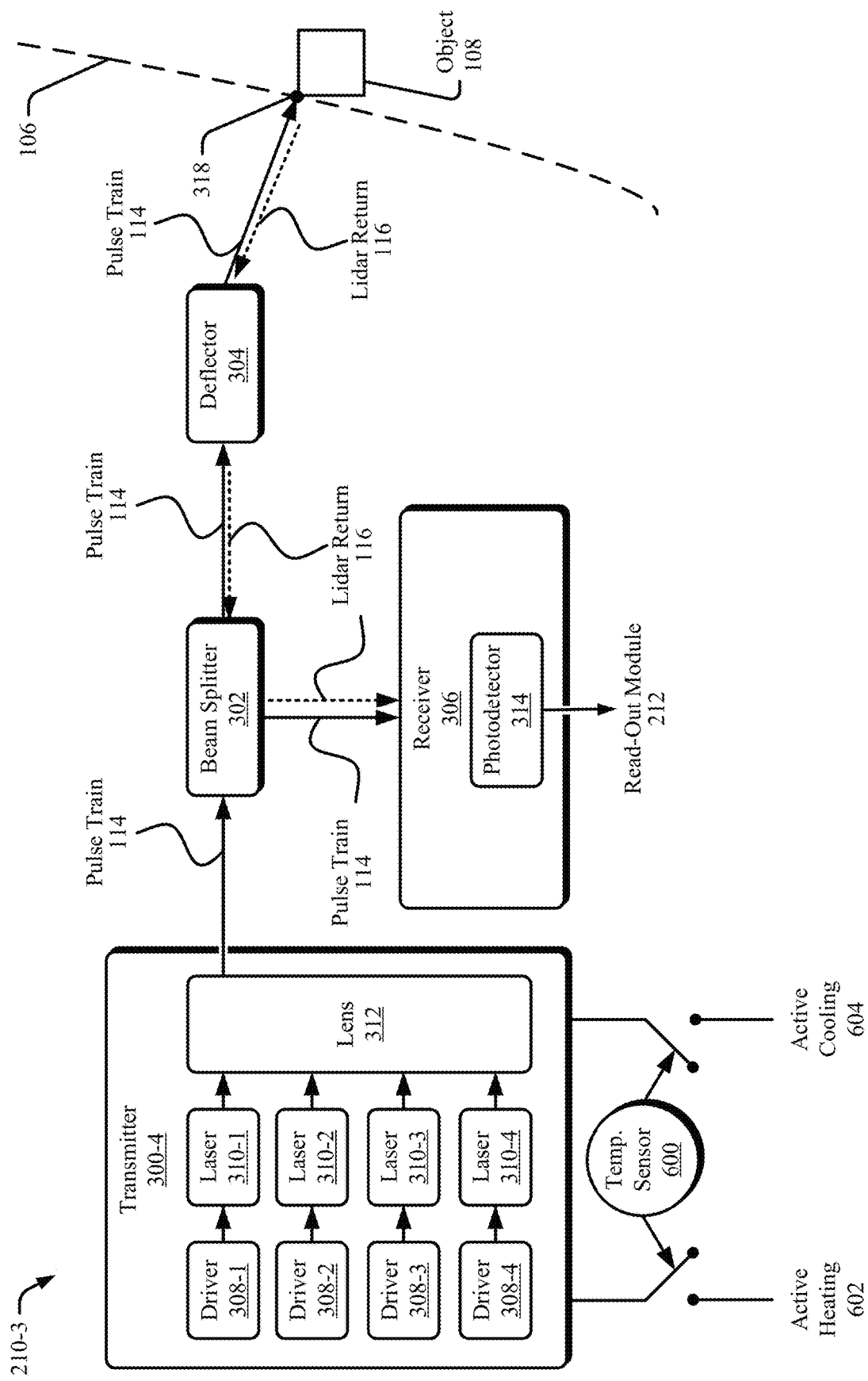
Figures 2, 6:
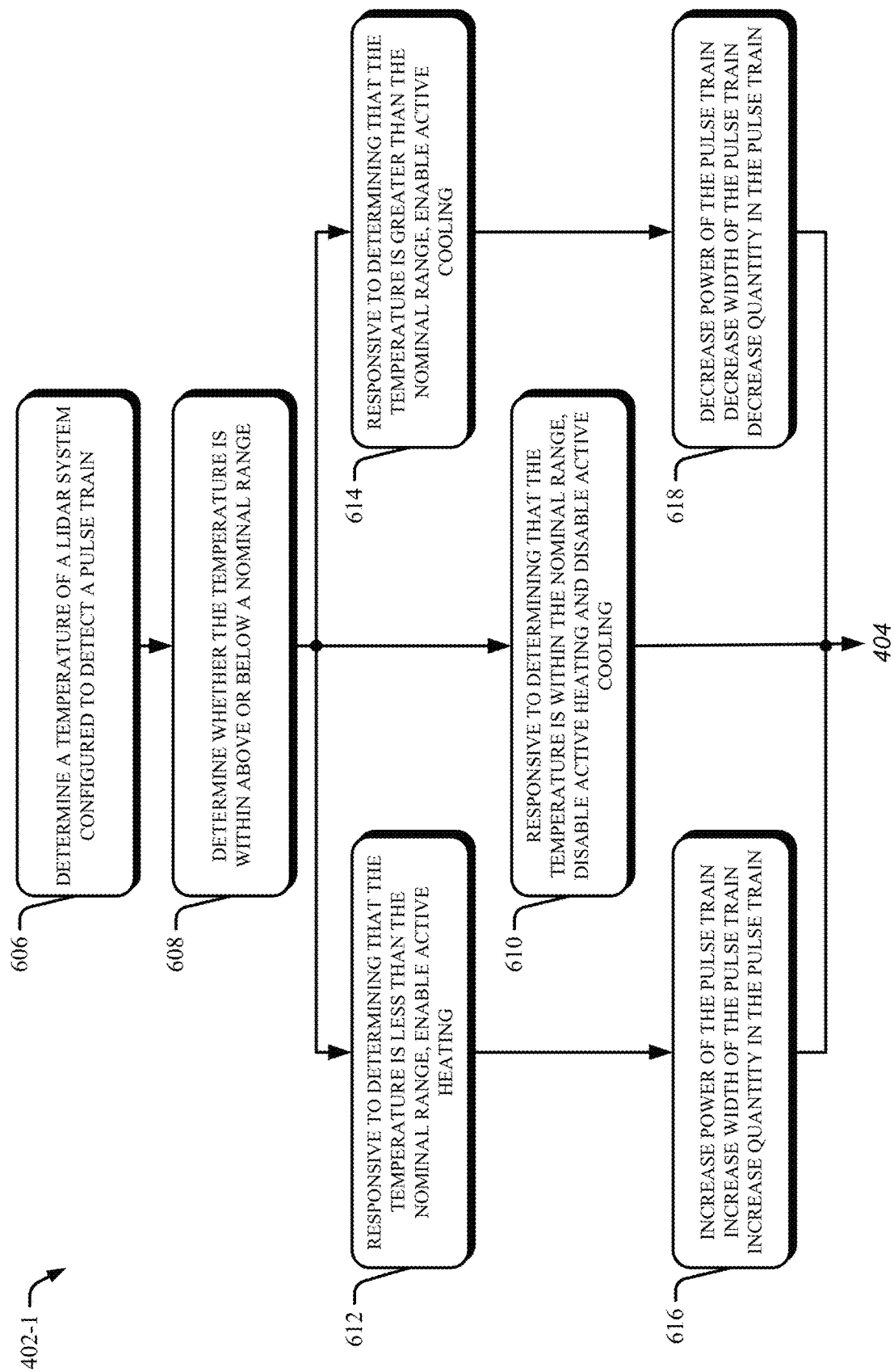
Figures 3, 6:
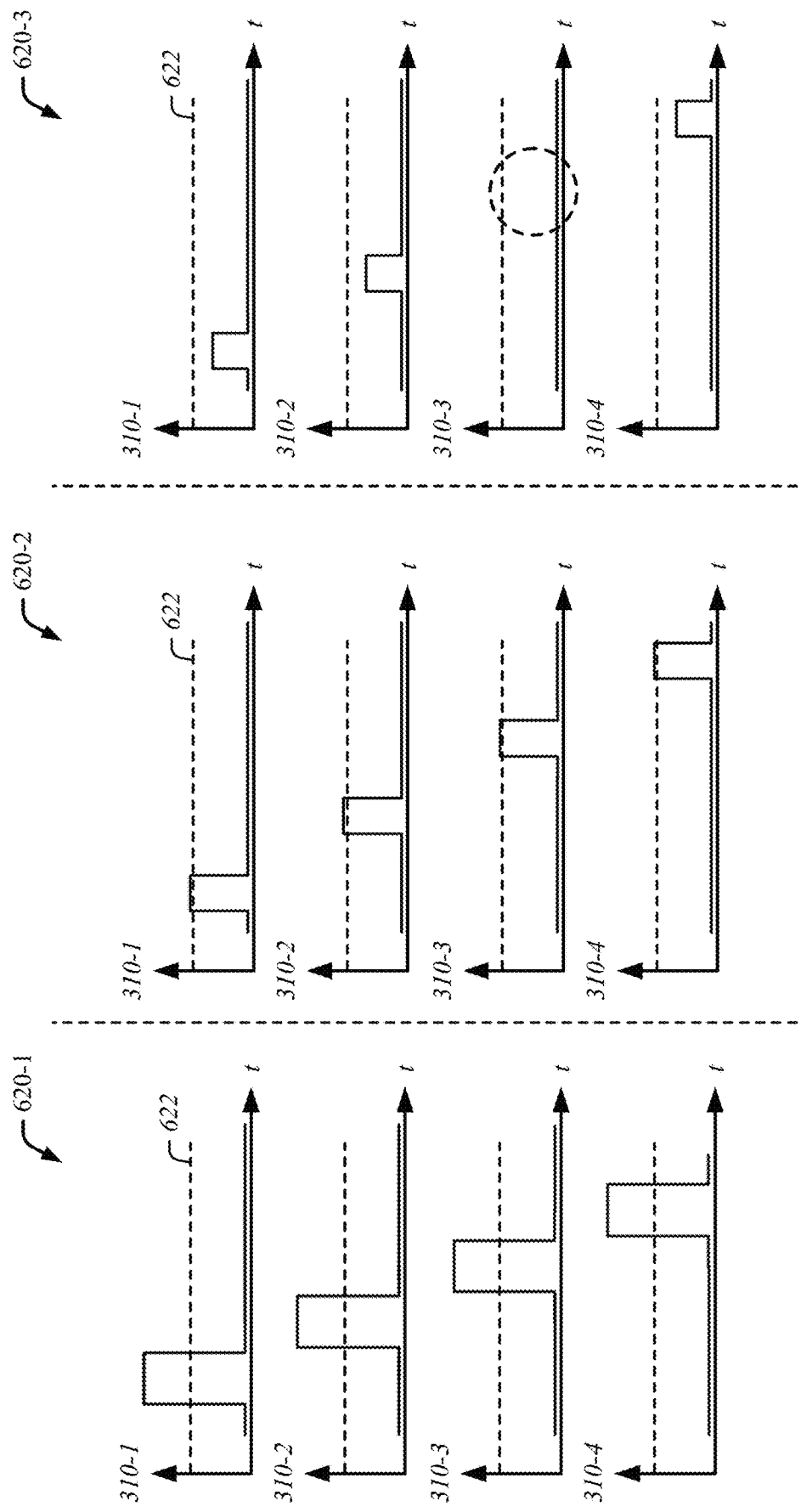

FIG. 6-1 illustrates a transceiver 210-3 as another example transceiver of the lidar system 102. The transceiver 210-3 is identical to the transceiver 210-2 except for a temperature sensor 600. The temperature sensor 600 monitors a temperature of the transmitter 300-4. An output of the temperature sensor 600 is used by a temperature controller (not shown) to selectively control whether the transmitter 300-4 receives active heating 602 (e.g., from a heat source) or active cooling 604 (e.g., from a cooling source), if either. Logic in the receiver 306 or an input from the processor 214 can enable either the active heating 602 or the active cooling 604 by executing a method 402-1.

Outputting a pulse train 114, for example, including a combination of high energy pulses, can cause a transmitter temperature (e.g., a junction temperature of one or more laser diodes) to rise. The pulses in the pulse train 114 emit light, which produces energy that is released as heat to laser diodes and other parts of the transceiver 210-3. The temperature may increase to a level that exceeds the operating limits of the transmitter. The transceiver 210-3 enables the lidar system 102 to provide temperature control, maintaining the temperature of the transceiver 210-3 in one or more different temperature regions, for example, a low ambient temperature region and a high ambient temperature region.

By individually adjusting each laser 310-1 through 310-$m$ and/or each driver 308-1 through 308-$n$, the transceiver 210-3 is configured to scale power and resulting thermal output. The transceiver 210-3 can adjust laser parameters including a quantity of active lasers 310-1 through 310-$m$ or a quantity of active drivers 308-1 through 308-$n$, as well as, switch between natural convection and active heating or cooling when above or below a nominal ambient temperature or outside a nominal range. The laser parameters can include an output power, intensity level of the pulse train, energy level of the pulse train, a quantity of pulses in the pulse train, a width or duration of the pulses in the pulse train, among other parameters. In this way, characteristics of the pulse train are tightly controlled to maintain the temperature, which is measured by the temperature sensor 600, within the nominal range. The nominal temperature range can vary between lidar systems depending on physical arrangement and packaging of the components that make up the lidar system 102.

FIG. 6-2 illustrates the method 402-1, which corresponds to the step 402 from the method 400. When performing the step 402 of the method 400, the lidar system 102 may emit a pulse train including multiple lidar pulses by performing the method 402-1. The method 402-1 is shown as sets of operations (or acts) performed in, but not limited to the order or combinations in which the operations are shown herein. Further, any of one or more of the operations may be repeated, combined, or reorganized to provide other methods.

At 606, a temperature of the lidar system 102 is determined. For example, the temperature sensor 600 outputs an indication of the temperature of the transmitter 300-4.

At 608, whether the temperature is within a nominal range is determined. For example, if the temperature sensor indicates that the transmitter 300-4 is at a temperature that is less than the nominal range, then at 612, the active heating 602 is enabled to bring the temperature up into the nominal range. A heater may be powered on to increase the temperature measured by the temperature sensor 600. In some examples, a heating element is activated to keep the temperature at or above a minimum temperature. In addition to, or alternatively to the active heating at step 612, the transmitter 300-4 can at 616, increase an amount of power associated with the pulse train 114, increase a width of any of the pulses in the pulse train 114, or increase a quantity of pulses in the pulse train 114, to raise the temperature into the nominal range. For example, turn to FIG. 6-3.

FIG. 6-3 illustrates additional example pulse trains 620-1 through 620-3 processed by the lidar system 102. The pulse train 620-1 includes four wide pulses above an energy level 622, the pulse train 620-2 includes four narrower pulses at the energy level 622, and the pulse train 620-3 includes three pulses below the energy level 622. The transmitter 300-4 may output the pulse train 620-1 when the temperature sensor 600 indicates the temperature is below the nominal range to maximize heat produced by the lasers 310-1 through 310-4. The transmitter 300-4 may output the pulse train 620-3 when the temperature sensor 600 indicates the temperature is above the nominal range to minimize heat produced by the lasers 310-1 through 310-4.

Returning to FIG. 6-2, at 614, if the temperature sensor indicates that the transmitter 300-4 is at a temperature that is greater than the nominal range, then at 614, the active cooling 604 is enabled to bring the temperature down into the nominal range. For example, a fan may be enabled to increase air circulation near the transmitter 300-4 and decrease the temperature measured by the temperature sensor 600. In some examples, a thermoelectric cooler is activated to keep the temperature at or below a maximum temperature.

In addition to, or alternatively to the active cooling at step 614, the transmitter 300-4 can at 618, decrease an amount of power associated with the pulse train 114, decrease a width of any of the pulses in the pulse train 114, or decrease a quantity of pulses in the pulse train 114, to raise the temperature into the nominal range. For example, turn back to FIG. 6-3. The pulse train 620-3 includes three narrow pulses below the energy level 622. The transmitter 300-4 may output the pulse train 620-3 when the temperature sensor 600 indicates the temperature is above the nominal range to minimize heat produced by the lasers 310-1 through 310-4.

In some examples, the transceiver 210-3 provides precise temperature control maintaining the temperature of the transceiver 210-3 within one of multiple different temperature regions, for example, a low ambient temperature region and a high ambient temperature region. For example, the nominal range may include a first threshold set to a low ambient temperature and second threshold set to a high ambient temperature that is greater than the low ambient temperature and the first threshold. The active cooling may be activated at the step 614 in response to the temperature from the temperature sensor 600 exceeding the first threshold in the nominal range. In addition, the processor 214, the read-out module 212, or the receiver 306 may adjust the intensity of one or more pulses in the pulse train to reduce power output and heat production in response to the temperature exceeding the second threshold in the nominal range. The processor 214, the read-out module 212, or the receiver 306 may adjust characteristics of the pulse train 114 to prevent thermal damage in other ways, for example, by modifying a quantity of pulses in the pulse train 114 in response to the temperature exceeding even the high ambient temperature or nominal range. The transceiver 210-3 may refrain from outputting one or more pulses in the pulse train to reduce power in the pulse train and prevent increases to the temperature. Similar steps may be taken for cases where the temperature is below the nominal range, for example, enabling an active heating element or increasing power associated with the pulse train 114.

At 610, responsive to determining that the temperature is within the nominal range, the active heating 602 and the active cooling 604 can be disabled. For example, the heater and fan are disabled to maintain the temperature measured by the temperature sensor 600. The transmitter 300-4 can adjust an amount of power associated with the pulse train 114, adjust a width of any of the pulses in the pulse train 114, or adjust a quantity of pulses in the pulse train 114, to raise or lower the temperature within the nominal range based on heat produced by the lasers 310-1 through 310-4. The transmitter 300-4 may output the pulse train 620-2 when the temperature sensor 600 indicates the temperature is within the nominal range. After actively compensating for heat produced by the lasers 310-1 through 310-4, or not, the method 402-1 ends by entering the step 404 of the method 400.

Ocular Safety

Figure 7:
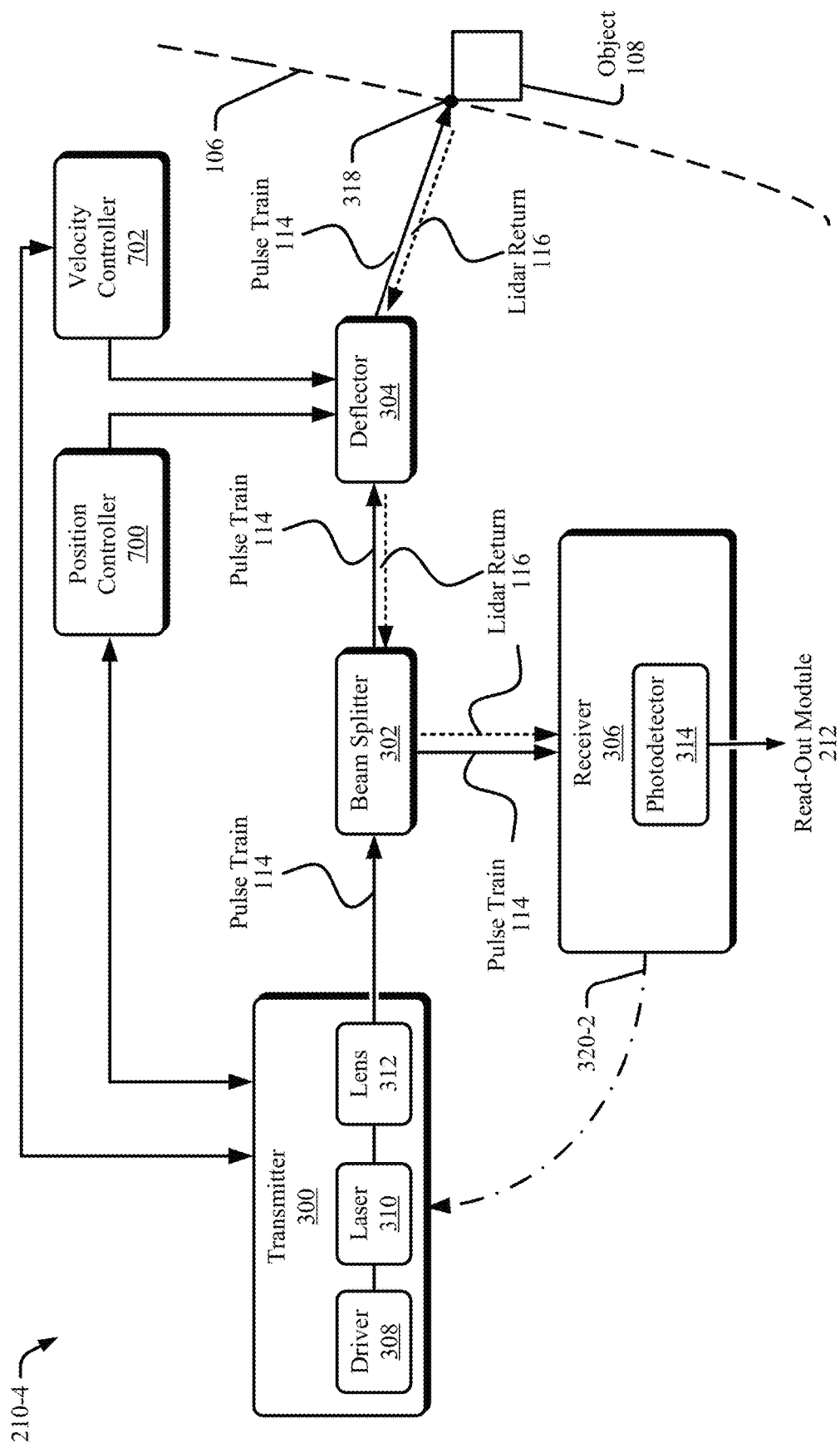
FIG. 7 illustrates another example transceiver of the TOF lidar system of FIG. 2.

FIG. 7 illustrates a transceiver 210-4 as another example transceiver of the lidar system 102. The transceiver 210-4 is identical to the transceiver 210-1, except the optional feedback loop 320-1 is replaced with a position controller 700 and a velocity controller 702, which enable control over the intensity of the pulse train 114 based on position or velocity of the deflector 304 or intensity of the return 116. The position controller 700 is configured to adjust a position of the deflector 304 based on feedback from the driver 308 of the transmitter 300. The velocity controller 702 is configured to use feedback from the driver 308 to modify how fast the deflector 304 changes position. The position controller 700 and the velocity controller 702 act together to align the deflector 304 to different pixels 318 in the field-of-view 106.

The transceiver 210-4 can use information obtained by the receiver 306 about an intensity of the return 116 to modify light emitted by the laser 310 to cause the pulse train 114 to be emitted within safe ocular conditions. For example, an intensity of the return 116 from a nearby object 108 may be unnecessarily high; lowering the intensity of the pulse train 114 may provide sufficient detection for ranging and classification of the object 108, while emitting light within limits for eye safety, for example, eye-safety standard IEC 60825-1, which provides a recommended amount of energy that can enter the eye without causing damage to the eye. Maximum Permissible Exposure (MPE) is defined as a function of exposure time to a fully open pupil and wavelength of a laser emission. The MPE is also a function of energy, which are affected by pulse duration and frequency in TOF designs.

To ensure safer ocular operation, other lidar systems may use multiple different wavelengths (e.g., 905 nm and 1550 nm) in combination. By using the combination of two laser wavelengths, a higher permitted total laser power in their field-of-view is achievable without threatening damage to a human eye. At the receiver, these systems require separate photodetectors to receive the reflected light at the two different wave lengths, which increases cost over single deflector designs.

In other lidar systems, intensity of a laser is adaptively controlled to ensure eye safety based on a carefully monitored position of the deflector. For example, a deflector includes a guard region where a lower intensity laser is used relative to other areas where a high-intensity laser is used. These other lidar systems include extra protections to guard against a system failure condition where the deflector malfunctions or stop working; these lidar systems can cause damages to an eye if allowed to emit a high-intensity laser while inadvertently positioned in the guard region. Unlike these other systems, the position controller 700 and velocity controller 702, in combination, provide eye-safety monitoring and failure mode protection to the transceiver 210-4.

The position controller 700 monitors position of the deflector 304 within the entire field-of-view 106 and provides the position to the driver 308. Depending on a spatial distribution of the object pixels 318 within the field-of-view 106, the position controller 700 may signal the transmitter 300 to change laser-firing-patterns to emit less energy and meets an eye-safety threshold. For example, a scanning pattern including raster scanning, Lissajous scanning, and the like, can cause some areas within the field-of-view 106 to have higher density of the object pixels 318. The position controller 700 senses as the deflector 304 reaches the higher density sections of the field-of-view 106 and mitigates the situation by varying the firing pattern or reducing power. For example, the transmitter 300 determines a density of an object pixel area in the field-of-view and adjusts, based on the density of the object pixel area, the driver 308 to emit a pulse train including pulses of a lower intensity if the density of the object pixel area exceeds a safety threshold. The processor 214, the receiver 306, or the transmitter 300 can direct the driver 308 to cease emitting the pulse train 114 with the laser 310 in response to the density exceeding the safety threshold.

The velocity controller 702 monitors movement of the deflector 304 within each scanning period or frame and provides feedback to the driver 308. In case of a failure situation at the deflector 304 (e.g., the deflector 304 fails to align to a particular object pixel 318), the driver 308 can stop transmission of the pulse train 114 in order to prevent damage to an eye. For example, if velocity of the deflector 304 is too slow, risk is elevated that the pulse train 114 will over energize and damage an eye if the velocity falls below a threshold velocity. In such a case, the velocity controller 702 may output a signal to the driver 308 to stop the laser 310 from firing to mitigate the risk of damaging an eye.

In this way, the lidar system 102 can implement ocular safety without having to define a guard region. It dynamically controls the laser 310 based on whether the velocity and position of the deflector 304 is accurate and reduces intensity of the laser 310 output if necessary, for example, in high pixel dense regions or when an intensity of the return 116 indicates objects nearby.

EXAMPLES

In the following section, examples are provided.

Example 1. A lidar system configured to: emit a pulse train comprising multiple lidar pulses; determine, based on an intensity of at least one lidar pulse in the pulse train, an intensity at which to sample reflections of the pulse train; identify a lidar return corresponding to the pulse train by sampling the reflections at the intensity determined based on the intensity of the at least one lidar pulse in the pulse train; and output, based on analyzing the lidar return, an indication of at least one of distance or speed associated with an object pixel in a field-of-view.

Example 2. The lidar system of any of the preceding examples, wherein: the lidar system comprises a laser focused on the object pixel in the field-of-view; and the lidar system is configured to emit the pulse train by driving the laser.

Example 3. The lidar system of any of the preceding examples, wherein: the lidar system further comprises a beam splitter and a deflector; and the lidar system is further configured to: focus the laser through the beam splitter and to a spot of the deflector; align the spot of the deflector to the object pixel in the field-of-view; and identify the lidar return by sampling the reflections from the beam splitter.

Example 4. The lidar system of any of the preceding examples, wherein the lidar system comprises a driver, the driver being configured to: drive the laser at a first intensity during a first pulse in the pulse train; and drive the laser at a second intensity during a second pulse in the pulse train.

Example 5. The lidar system of any of the preceding examples, wherein the laser comprises an array of laser diodes including: a first laser diode configured to emit the first pulse in the pulse train at the first intensity; and a second laser diode configured to emit the second pulse in the pulse train at the second intensity.

Example 6. The lidar system of any of the preceding examples, wherein the driver comprises: a first driver configured to energize the laser to the first intensity during the first pulse in the pulse train; and a second driver configured to energize the laser to the second intensity during the second pulse in the pulse train.

Example 7. The lidar system of any of the preceding examples, wherein the laser comprises an array of laser diodes: the first driver is configured to energize a first laser diode to the first intensity during the first pulse in the pulse train; and the second driver is configured to energize a second laser diode to the second intensity during the second pulse in the pulse train.

Example 8. The lidar system of any of the preceding examples, wherein the lidar system is configured to determine the intensity at which to sample the reflections of the pulse train by determining a first intensity of a first pulse in the pulse train and determining a second intensity of at least one second pulse in the pulse train.

Example 9. The lidar system of any of the preceding examples, wherein the lidar system is configured to identify the lidar return corresponding to the pulse train by: adjusting a sensitivity of a photodetector to the first intensity and the second intensity; and sampling the lidar return from the adjusted photodetector.

Example 10. The lidar system of any of the preceding examples, wherein the photodetector comprises at least one of a photo diode, a silicon photomultiplier, an avalanche photo diode, a single-photon avalanche diode, a photomultiplier tube, or a PIN diode.

Example 11. The lidar system of any of the preceding examples, wherein the lidar system further comprises at least one of an analog to digital converter or a time to digital converter configured to sample the lidar return from the adjusted photodetector.

Example 12. The lidar system of any of the preceding examples, wherein the lidar system is further configured to: determine a return time of the pulse train in response to sampling the lidar return; and determine, based on the return time of the pulse train, the at least one of distance or speed associated with the object pixel in the field-of-view.

Example 13. The lidar system of any of the preceding examples, wherein the multiple lidar pulses of the pulse train include three or more pulses.

Example 14. A method comprising: emitting, by a lidar system, a pulse train comprising multiple lidar pulses; determining, by the lidar system and based on an intensity of at least one lidar pulse in the pulse train, an intensity at which to sample reflections of the pulse train; identifying, by the lidar system, a lidar return corresponding to the pulse train by sampling the reflections at the intensity determined based on the intensity of the at least one lidar pulse in the pulse train; and outputting, by the lidar system, based on analyzing the lidar return, an indication of at least one of distance or speed associated with an object pixel in a field-of-view.

Example 15. The method of any of the preceding examples, further comprising: focusing, by the lidar system, a laser through a beam splitter and to a spot of a deflector; aligning, by the lidar system, the spot of the deflector to the object pixel in the field-of-view; and identifying, by the lidar system, the lidar return by sampling the reflections from the beam splitter.

Example 16. The method of any of the preceding examples, further comprising: emitting, by the lidar system, a first pulse in the pulse train at a first intensity; and emitting, by the lidar system, a second pulse in the pulse train at a second intensity.

Example 17. The method of any of the preceding examples, wherein determining the intensity at which to sample the reflections of the pulse train comprises determining a first intensity of a first pulse in the pulse train and determining a second intensity of at least one second pulse in the pulse train.

Example 18. The method of any of the preceding examples, wherein identifying the lidar return corresponding to the pulse train comprises at least one of: adjusting a sensitivity of a photodetector to the first intensity and the second intensity; and sampling the lidar return from the adjusted photodetector.

Example 19. The method of any of the preceding examples, further comprising: determining, by the lidar system, a return time of the pulse train in response to sampling the lidar return; and determining, by the lidar system, based on the return time of the pulse train, the distance or speed associated with the object pixel in the field-of-view.

Example 20. A lidar system comprising: a driver and a laser configured to emit a pulse train comprising a first lidar pulse at a first intensity and a second lidar pulse at a second intensity; a photodetector configured, based on a combination of the first and second intensities, to detect reflections of the pulse train; a sampling unit configured to sample the reflections from the photodetector at the combination of the first and second intensities; and a processor configured to determine, based on the reflections, at least one of a distance or speed associated with an object pixel in a field-of-view.

Example 21. The lidar system of any of the preceding examples, wherein the driver comprises: a first driver configured to drive the laser to the first intensity during the first lidar pulse; and a second driver configured to drive the laser to the second intensity during the second lidar pulse.

Example 22. The lidar system of any of the preceding examples, wherein the laser comprises: a first laser configured to emit the first lidar pulse at the first intensity; and a second laser configured to emit the second lidar pulse at the second intensity.

Example 23. The lidar system of any of the preceding examples, wherein the driver comprises: a first driver configured to drive the first laser to the first intensity during the first lidar pulse; and a second driver configured to drive the second laser to the second intensity during the second lidar pulse.

Example 24. The lidar system of any of the preceding examples, wherein: the lidar system further comprises: a temperature sensor configured to obtain a temperature of the laser; and active cooling enabled in response to the temperature of the laser exceeding a first threshold in a nominal range; and the processor is further configured to adjust the first intensity of the first pulse and the second intensity of the second pulse in response to the temperature of the laser exceeding a second threshold in the nominal range that is greater than the first threshold.

Example 25. The lidar system of any of the preceding examples, wherein: the lidar system further comprises: a deflector configured to align a spot to the object pixel in the field of view; and a beam splitter configured to focus the laser to the spot of the deflector; and the photodetector is further configured to detect the reflections of the pulse train from the beam splitter.

Example 26. The lidar system of any of the preceding examples, wherein the pulse train comprises a first pulse train, and the processor is further configured to: determine a density of an object pixel area in the field-of-view; and adjust, based on the density of the object pixel area, the driver to emit a second pulse train comprising a third lidar pulse at a third intensity and a fourth lidar pulse at a fourth intensity.

Example 27. The lidar system of any of the preceding examples, wherein the third intensity is less than the first intensity and the fourth intensity is less than the second intensity if the density of the object pixel area exceeds a safety threshold.

Example 28. The lidar system of any of the preceding examples, wherein the processor is further configured to direct the driver to cease emitting the pulse train with the laser in response to the density exceeding the safety threshold.

Example 29. The lidar system of any of the preceding examples, wherein the processor is further configured to direct the driver to refrain from emitting the second lidar pulse in response to a temperature of the laser exceeding a third threshold that is greater than a second threshold.

Example 30. The lidar system of any of the preceding examples further including means for performing the methods of any of the preceding examples.

Conclusion

While various embodiments of the disclosure are described in the foregoing description and shown in the drawings, it is to be understood that this disclosure is not limited thereto but may be variously embodied to practice within the scope of the following claims. From the foregoing Description, it will be apparent that various changes may be made without departing from the spirit and scope of the disclosure as defined by the following claims.

The use of "or" and grammatically related terms indicates non-exclusive alternatives without limitation, unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A lidar system configured to:
   emit a pulse train comprising multiple lidar pulses with varying intensities, a pattern of intensity being modified from one object pixel to a next object pixel;
   determine, based on an intensity of at least one lidar pulse in the pulse train, an intensity at which to sample reflections of the pulse train;
   identify a lidar return corresponding to the pulse train by sampling the reflections at the intensity determined based on the intensity of the at least one lidar pulse in the pulse train; and
   output, based on analyzing the lidar return, an indication of at least one of distance or speed associated with an object pixel in a field-of-view from among the one object pixel and the new object pixel.

2. The lidar system of claim 1, wherein:
   the lidar system comprises a laser focused on the object pixel in the field-of-view; and
   the lidar system is configured to emit the pulse train by driving the laser.

3. The lidar system of claim 2, wherein:
   the lidar system further comprises a beam splitter and a deflector; and
   the lidar system is further configured to:
      focus the laser through the beam splitter and to a spot of the deflector;
      align the spot of the deflector to the object pixel in the field-of-view; and
      identify the lidar return by sampling the reflections from the beam splitter.

4. The lidar system of claim 2, wherein the lidar system comprises a driver, the driver being configured to:
   drive the laser at a first intensity during a first pulse in the pulse train; and
   drive the laser at a second intensity during a second pulse in the pulse train.

5. The lidar system of claim 4, wherein the laser comprises an array of laser diodes including:
   a first laser diode configured to emit the first pulse in the pulse train at the first intensity; and
   a second laser diode configured to emit the second pulse in the pulse train at the second intensity.

6. The lidar system of claim 4, wherein the driver comprises:
   a first driver configured to energize the laser to the first intensity during the first pulse in the pulse train; and
   a second driver configured to energize the laser to the second intensity during the second pulse in the pulse train.

7. The lidar system of claim 6, wherein the laser comprises an array of laser diodes:
   the first driver is configured to energize a first laser diode to the first intensity during the first pulse in the pulse train; and
   the second driver is configured to energize a second laser diode to the second intensity during the second pulse in the pulse train.

8. The lidar system of claim 1, wherein the lidar system is configured to determine the intensity at which to sample the reflections of the pulse train by determining a first intensity of a first pulse in the pulse train and determining a second intensity of at least one second pulse in the pulse train.

9. The lidar system of claim 8, wherein the lidar system is configured to identify the lidar return corresponding to the pulse train by:
   adjusting a sensitivity of a photodetector to the first intensity and the second intensity; and
   sampling the lidar return from the adjusted photodetector.

10. The lidar system of claim 9, wherein the photodetector comprises at least one of a photo diode, a silicon photomultiplier, an avalanche photo diode, a single-photon avalanche diode, a photomultiplier tube, or a PIN diode.

11. The lidar system of claim 9, wherein the lidar system further comprises at least one of an analog to digital converter or a time to digital converter configured to sample the lidar return from the adjusted photodetector.

12. The lidar system of claim 1, wherein the lidar system is further configured to:
   determine a return time of the pulse train in response to sampling the lidar return; and
   determine, based on the return time of the pulse train, the at least one of distance or speed associated with the object pixel in the field-of-view.

13. The lidar system of claim 1, wherein the multiple lidar pulses of the pulse train include three or more pulses.

14. A method comprising:
   emitting, by a lidar system, a pulse train comprising multiple lidar pulses with varying intensities, a pattern of intensity being modified from one object pixel to a next object pixel;
   determining, by the lidar system and based on an intensity of at least one lidar pulse in the pulse train, an intensity at which to sample reflections of the pulse train;
   identifying, by the lidar system, a lidar return corresponding to the pulse train by sampling the reflections at the intensity determined based on the intensity of the at least one lidar pulse in the pulse train; and
   outputting, by the lidar system, based on analyzing the lidar return, an indication of at least one of distance or speed associated with an object pixel in a field-of-view from among the one object pixel and the next object pixel.

15. The method of claim 14, further comprising:
   focusing, by the lidar system, a laser through a beam splitter and to a spot of a deflector;
   aligning, by the lidar system, the spot of the deflector to the object pixel in the field-of-view; and
   identifying, by the lidar system, the lidar return by sampling the reflections from the beam splitter.

16. The method of claim 15, further comprising:
   emitting, by the lidar system, a first pulse in the pulse train at a first intensity; and
   emitting, by the lidar system, a second pulse in the pulse train at a second intensity.

17. The method of claim 14, wherein determining the intensity at which to sample the reflections of the pulse train comprises determining a first intensity of a first pulse in the pulse train and determining a second intensity of at least one second pulse in the pulse train.

18. The method of claim 17, wherein identifying the lidar return corresponding to the pulse train comprises at least one of:
   adjusting a sensitivity of a photodetector to the first intensity and the second intensity; and
   sampling the lidar return from the adjusted photodetector.

19. The method of claim 14, further comprising:
   determining, by the lidar system, a return time of the pulse train in response to sampling the lidar return; and
   determining, by the lidar system, based on the return time of the pulse train, the distance or speed associated with the object pixel in the field-of-view.

20. A lidar system comprising:
   a driver and a laser configured to emit a pulse train comprising a first lidar pulse at a first intensity and a second lidar pulse at a second intensity, wherein a pattern of intensity is modified from one object pixel to a next object pixel;
   a photodetector configured, based on a combination of the first and second intensities, to detect reflections of the pulse train;
   a sampling unit configured to sample the reflections from the photodetector at the combination of the first and second intensities; and
   a processor configured to determine, based on the reflections, at least one of a distance or speed associated with an object pixel in a field-of-view from among the one object pixel and the next object pixel.

21. The lidar system of claim 20, wherein the driver comprises:
   a first driver configured to drive the laser to the first intensity during the first lidar pulse; and
   a second driver configured to drive the laser to the second intensity during the second lidar pulse.

22. The lidar system of claim 20, wherein the laser comprises:
   a first laser configured to emit the first lidar pulse at the first intensity; and
   a second laser configured to emit the second lidar pulse at the second intensity.

23. The lidar system of claim 22, wherein the driver comprises:
   a first driver configured to drive the first laser to the first intensity during the first lidar pulse; and
   a second driver configured to drive the second laser to the second intensity during the second lidar pulse.

24. The lidar system of claim 20, wherein:
   the lidar system further comprises:
   a temperature sensor configured to obtain a temperature of the laser; and
   active cooling enabled in response to the temperature of the laser exceeding a first threshold in a nominal range; and
   the processor is further configured to adjust the first intensity of the first pulse and the second intensity of the second pulse in response to the temperature of the laser exceeding a second threshold in the nominal range that is greater than the first threshold.

25. The lidar system of claim 20, wherein:
   the lidar system further comprises:
   a deflector configured to align a spot to the object pixel in the field of view; and
   a beam splitter configured to focus the laser to the spot of the deflector; and
   the photodetector is further configured to detect the reflections of the pulse train from the beam splitter.

26. The lidar system of claim 20, wherein the pulse train comprises a first pulse train, and the processor is further configured to:
   determine a density of an object pixel area in the field-of-view; and adjust, based on the density of the object pixel area, the driver to emit a second pulse train comprising a third lidar pulse at a third intensity and a fourth lidar pulse at a fourth intensity.

27. The lidar system of claim 26, wherein the third intensity is less than the first intensity and the fourth intensity is less than the second intensity if the density of the object pixel area exceeds a safety threshold.

28. The lidar system of claim 27, wherein the processor is further configured to direct the driver to cease emitting the pulse train with the laser in response to the density exceeding the safety threshold.

29. The lidar system of claim 20, wherein the processor is further configured to direct the driver to refrain from emitting the second lidar pulse in response to a temperature of the laser exceeding a third threshold that is greater than a second threshold.

* * * * *

UNITED STATES PATENT AND TRADEMARK OFFICE
CERTIFICATE OF CORRECTION

PATENT NO. : 11,982,749 B2  
APPLICATION NO. : 16/927499  
DATED : May 14, 2024  
INVENTOR(S) : Denis Rainko Page 1 of 1

It is certified that error appears in the above-identified patent and that said Letters Patent is hereby corrected as shown below:

In the Claims

Column 20, Line 22: In Claim 1, delete "new" and insert --next-- therefor

Signed and Sealed this  
Eighth Day of April, 2025

Coke Morgan Stewart  
*Acting Director of the United States Patent and Trademark Office*